US011269250B2

(12) United States Patent
Ida et al.

(10) Patent No.: US 11,269,250 B2
(45) Date of Patent: Mar. 8, 2022

(54) INFORMATION PROCESSING APPARATUS, INFORMATION PROCESSING METHOD, AND PROGRAM

(71) Applicant: SONY CORPORATION, Tokyo (JP)

(72) Inventors: Kentaro Ida, Tokyo (JP); Takuya Ikeda, Tokyo (JP); Kazuyuki Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 314 days.

(21) Appl. No.: 16/068,984

(22) PCT Filed: Feb. 24, 2017

(86) PCT No.: PCT/JP2017/006991
§ 371 (c)(1),
(2) Date: Jul. 10, 2018

(87) PCT Pub. No.: WO2017/154609
PCT Pub. Date: Sep. 14, 2017

(65) Prior Publication Data
US 2020/0393750 A1      Dec. 17, 2020

(30) Foreign Application Priority Data

Mar. 10, 2016   (JP)   .............................. JP2016-047656

(51) Int. Cl.
*G03B 37/04* (2021.01)
*H04N 9/31* (2006.01)

(52) U.S. Cl.
CPC ........... *G03B 37/04* (2013.01); *H04N 9/3147* (2013.01); *H04N 9/3155* (2013.01); *H04N 9/3182* (2013.01); *H04N 9/3185* (2013.01)

(58) Field of Classification Search
None
See application file for complete search history.

(56) References Cited

U.S. PATENT DOCUMENTS 8,388,140 B2 *   3/2013   Sato ..................... G03B 37/04
                                                    353/31
9,128,358 B2 *   9/2015   Kubota ................ H04N 9/3147
(Continued)

FOREIGN PATENT DOCUMENTS

CN      102170544 A      8/2011
CN      103324011 A      9/2013
(Continued)

*Primary Examiner* — Chikaodili E Anyikire
(74) *Attorney, Agent, or Firm* — Paratus Law Group, PLLC

(57) ABSTRACT

There is provided an information processing apparatus, an information processing method, and a program that can enhance an effect obtained by causing display ranges of a plurality of display devices to overlap in a field of view of a user and displaying an image, the information processing apparatus including: an image control unit configured to, when a relationship between a first image and a second image satisfies a predetermined condition, the first image being displayed in a first field of view from a first display device, and the second image being displayed in a second field of view at least partially overlapping with the first field of view from a second display device different from the first display device, start display of the second image from the second display device. The present technology can be applied to, for example, a system using a drive-type projector.

21 Claims, 15 Drawing Sheets

(56) References Cited

U.S. PATENT DOCUMENTS

| | | | |
|---|---|---|---|
| 9,625,804 B2* | 4/2017 | Kim | H04N 9/3194 |
| 9,930,307 B1* | 3/2018 | Kursula | H04N 9/3147 |
| 2010/0128228 A1* | 5/2010 | Matsuo | G03B 21/30 |
| | | | 353/34 |
| 2011/0007172 A1 | 1/2011 | Miceli | |
| 2011/0075101 A1* | 3/2011 | Sato | H04N 9/3147 |
| | | | 353/30 |
| 2011/0211065 A1* | 9/2011 | Furui | H04N 9/3147 |
| | | | 348/135 |
| 2013/0222386 A1* | 8/2013 | Tannhauser | G06T 3/4038 |
| | | | 345/428 |
| 2014/0146080 A1 | 5/2014 | Ivashin et al. | |
| 2015/0312563 A1 | 10/2015 | Ito | |
| 2017/0310937 A1* | 10/2017 | Wada | G06T 5/50 |
| 2018/0139422 A1* | 5/2018 | Moule | H04N 9/3182 |
| 2018/0139423 A1* | 5/2018 | Moule | H04N 9/3147 |

FOREIGN PATENT DOCUMENTS

| | | |
|---|---|---|
| CN | 103533276 A | 1/2014 |
| CN | 104702928 A | 6/2015 |
| GB | 2499635 A | 8/2013 |
| JP | H06-303626 A | 10/1994 |
| JP | H09-138368 A | 5/1997 |
| JP | H10-301202 A | 11/1998 |
| JP | H11-027608 A | 1/1999 |
| JP | 2008-009299 A | 1/2008 |
| JP | 2010-086928 A | 4/2010 |
| JP | 2011-203286 A | 10/2011 |
| JP | 2011-217307 A | 10/2011 |
| JP | 2015-103880 A | 6/2015 |
| JP | 2015-119339 A | 6/2015 |
| JP | 2016-025396 A | 2/2016 |

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2017/006991 (filed on Feb. 24, 2017) under 35 U.S.C. § 371, which claims priority to Japanese Patent Application No. 2016-047656 (filed on Mar. 10, 2016), which are all hereby incorporated by reference in their entirety.

TECHNICAL FIELD

The present technology relates to an information processing apparatus, an information processing method, and a program, and more particularly to an information processing apparatus, an information processing method, and a program that are suitable for use in causing display ranges of a plurality of display devices to overlap in a field of view of a user and displaying an image.

BACKGROUND ART

Conventionally, a drive-type projector capable of changing a projecting direction by changing a direction of the projector by a drive unit rotatable in a pan direction (horizontal direction) and a tilt direction (vertical direction) has been proposed (for example, see Patent Document 1).

For example, rich image expression can be realized by projecting an image by the drive-type projector within an image projected by a fixed-type projector with a fixed projecting direction, and moving the image of the drive-type projector within the image of the fixed-type projector or moving the image of the drive-type projector to an outside of the image of the fixed-type projector.

CITATION LIST

Patent Document

Patent Document 1: Japanese Patent Application Laid-Open No. 2010-86928

SUMMARY OF THE INVENTION

Problems to be Solved by the Invention

However, for example, in the case of switching display of an image from one projector to another projector in a portion where a projection area of the fixed-type projector and a projection area of the drive-type projector overlap, feeling of strangeness and discomfort is provided to the user if a difference in images before and after switching is significant. As a result, an effect obtained by causing the projection areas of the two projectors to overlap and displaying the image is reduced.

Therefore, the present technology enhances an effect obtained by causing display ranges of a plurality of display devices to overlap in a field of view of a user and displaying an image.

Solutions to Problems

An information processing apparatus according to one aspect of the present technology includes an image control unit configured to, when a relationship between a first image and a second image satisfies a predetermined condition, the first image being displayed in a first field of view from a first display device, and the second image being displayed in a second field of view at least partially overlapping with the first field of view from a second display device different from the first display device, start display of the second image from the second display device.

The information processing apparatus causes the first display device and the second display device to be projectors, and when the relationship between the first image and the second image satisfies the predetermined condition, the first image being at least a part of an image projected on a first area from the first display device, and the second image being projected on a second area at least partially overlapping with the first area from the second display device, causes the image control unit to start projection of the second image from the second display device.

The predetermined condition can be that a difference between a characteristic of the first image and a characteristic of the second image falls within a predetermined range.

The information processing apparatus can cause the characteristic of the first image and the characteristic of the second image to include at least one of a projection position, a localization position in a depth direction, luminance, resolution, a geometric correction value, a frame rate, a color, and a display size.

The information processing apparatus can cause the image control unit to control the first image or the second image so that the difference between the characteristic of the first image and the characteristic of the second image falls within the predetermined range, before starting the projection of the second image.

One image of the first image and the second image can be a three-dimensional image.

When the other image of the first image and the second image is a two-dimensional image, the information processing apparatus can cause the image control unit to adjust a localization position in a depth direction of the one image to a plane on which an image is projected, before starting the projection of the second image.

The information processing apparatus can cause the image control unit to adjust the characteristic of the first image to the characteristic of the second image.

The information processing apparatus can cause the image control unit to acquire a setting value of the characteristic of the first image from a control unit that controls display of the second image.

The information processing apparatus can cause the image control unit to adjust the characteristic of the second image to the characteristic of the first image.

The information processing apparatus can cause the image control unit to acquire a setting value of the characteristic of the second image from a control unit that controls display of the first image.

The information processing apparatus can cause the image control unit to start movement of a projection position of the second image after starting projection of the second image.

In a case of projecting an image of the second display device within a projection area of an image of the first display device, the information processing apparatus can cause the image control unit to set at least a part of a characteristic of the image of the second display device to a value different from the image of the first display device.

The information processing apparatus can cause the image control unit to set at least one of resolution and luminance of the image of the second display device to be higher than that of the image of the first display device.

The information processing apparatus can cause the image control unit to cause the second display device to project an image related to an image of the first display device, the image of the first display device being displayed in a projection area or a vicinity of the projection area of the second display device.

The first display device or the second display device can be further provided.

At least one of the first display device and the second display device can be a drive-type projector.

An information processing method of one aspect of the present technology includes an image control step of, when a relationship between a first image and a second image satisfies a predetermined condition, the first image being displayed in a first field of view from a first display device, and the second image being displayed in a second field of view at least partially overlapping with the first field of view from a second display device different from the first display device, starting display of the second image from the second display device.

A program of one aspect of the present technology causes a computer system to execute processing including an image control step of, when a relationship between a first image and a second image satisfies a predetermined condition, the first image being displayed in a first field of view from a first display device, and the second image being displayed in a second field of view at least partially overlapping with the first field of view from a second display device different from the first display device, starting display of the second image from the second display device.

In one aspect of the present technology, when a relationship between a first image and a second image satisfies a predetermined condition, the first image being displayed in a first field of view from a first display device, and the second image being displayed in a second field of view at least partially overlapping with the first field of view from a second display device different from the first display device, display of the second image from the second display device is started.

Effect of the Invention

According to one aspect of the present technology, an effect obtained by causing display ranges of a plurality of display devices to overlap in a field of view of a user and displaying an image can be enhanced.

Note that the effects described here are not necessarily limited, and any of effects described in the present disclosure may be exhibited.

MODE FOR CARRYING OUT THE INVENTION

Figure 1:
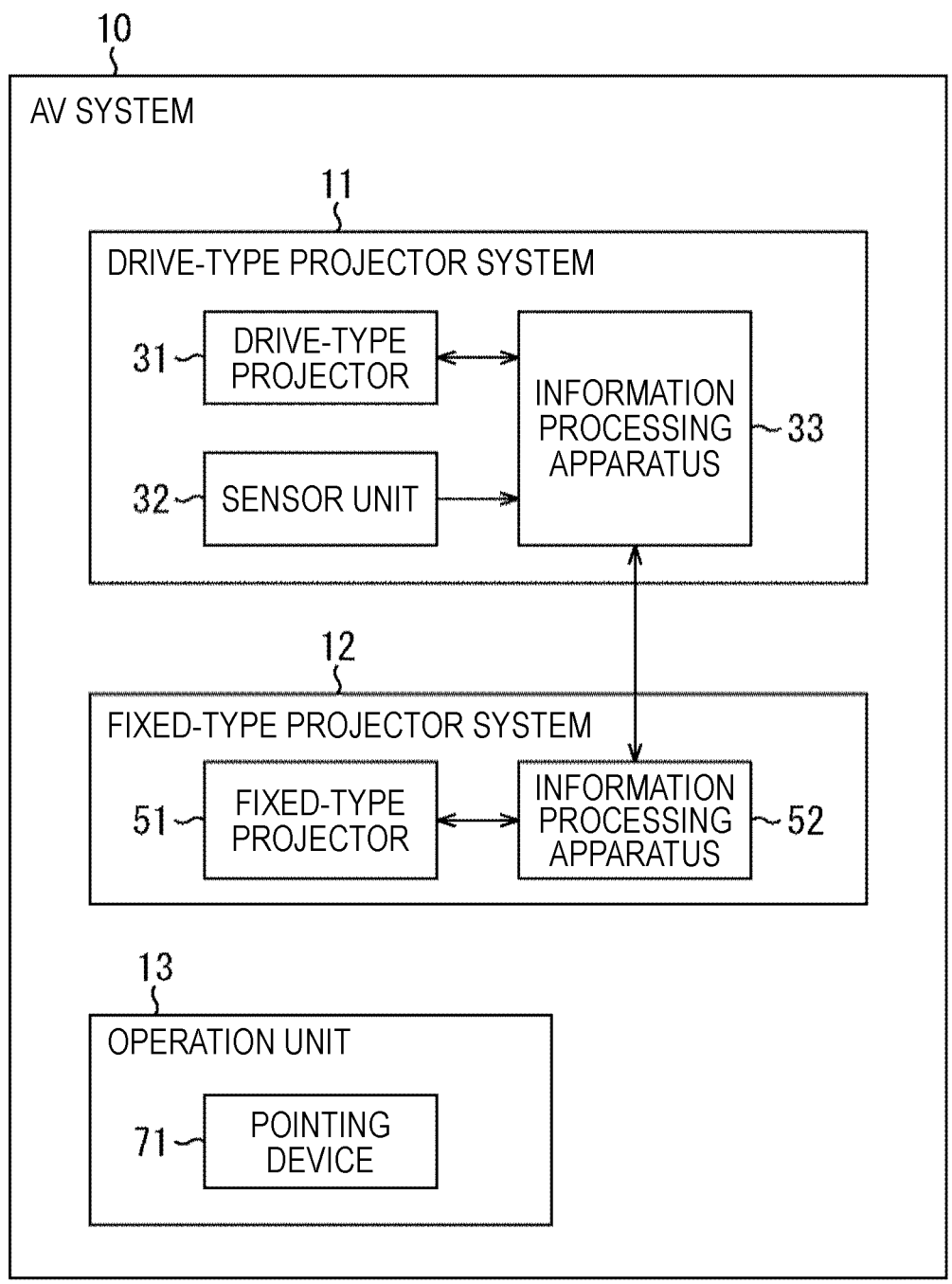
FIG. 1 is a block diagram illustrating an embodiment of an AV system to which the present technology is applied.

Hereinafter, a mode for carrying out the invention (hereinafter referred to as "embodiment") will be described in detail with reference to the drawings. Note that the description will be given in the following order.
1. Embodiment
2. Modification 1. Embodiment {Configuration Example of AV System 10}

First, a configuration example of an audio visual (AV) system 10 to which the present technology is applied will be described with reference to FIG. 1.

The AV system 10 is a system that projects an image in a predetermined space (hereinafter referred to as a display space) and outputs a sound accompanying the image by a drive-type projector system 11 and a fixed-type projector system 12.

The AV system 10 includes the drive-type projector system 11, the fixed-type projector system 12, and the operation unit 13.

The drive-type projector system 11 includes a drive-type projector 31, a sensor unit 32, and an information processing apparatus 33.

The drive-type projector 31 is a projector in which a projecting direction of an image is variable. An outputting direction of an output sound may be made variable in conjunction with the projecting direction of an image.

The sensor unit 32 detects data regarding the display space and supplies a detection result to the information processing apparatus 33.

The information processing apparatus 33 is configured by, for example, a computer, or a processor such as a CPU, a memory, and the like. The information processing apparatus 33 controls the drive-type projector 31. Further, the information processing apparatus 33 controls cooperation of an image of the drive-type projector 31 and an image of a fixed-type projector 51 in conjunction with an information processing apparatus 52 of the fixed-type projector system 12.

The fixed-type projector system 12 includes the fixed-type projector 51 and the information processing apparatus 52.

The fixed-type projector 51 is a projector in which a projecting direction of an image is fixed. That is, the fixed-type projector 51 projects an image in a predetermined projection area in the display space by projecting the image into an installed direction.

The information processing apparatus 52 is configured by, for example, a computer, or a processor such as a CPU, a memory, and the like. The information processing apparatus 52 controls the fixed-type projector 51. Further, the information processing apparatus 52 controls cooperation of the image of the fixed-type projector 51 and the image of the drive-type projector 31 in conjunction with the information processing apparatus 33 of the drive-type projector system 11.

The operation unit 13 includes a pointing device 71.

The pointing device 71 is an operation device for a user to point to a desired position. For example, the pointing device 71 irradiates a position with infrared light to point to the position (pointing position) according to a user's operation with the infrared light.

Note that the pointing device 71 may be configured by a dedicated device or by a general-purpose device usable for other uses such as a smartphone and a remote controller.

{Configuration Example of Drive-Type Projector System 11}

Figure 2:
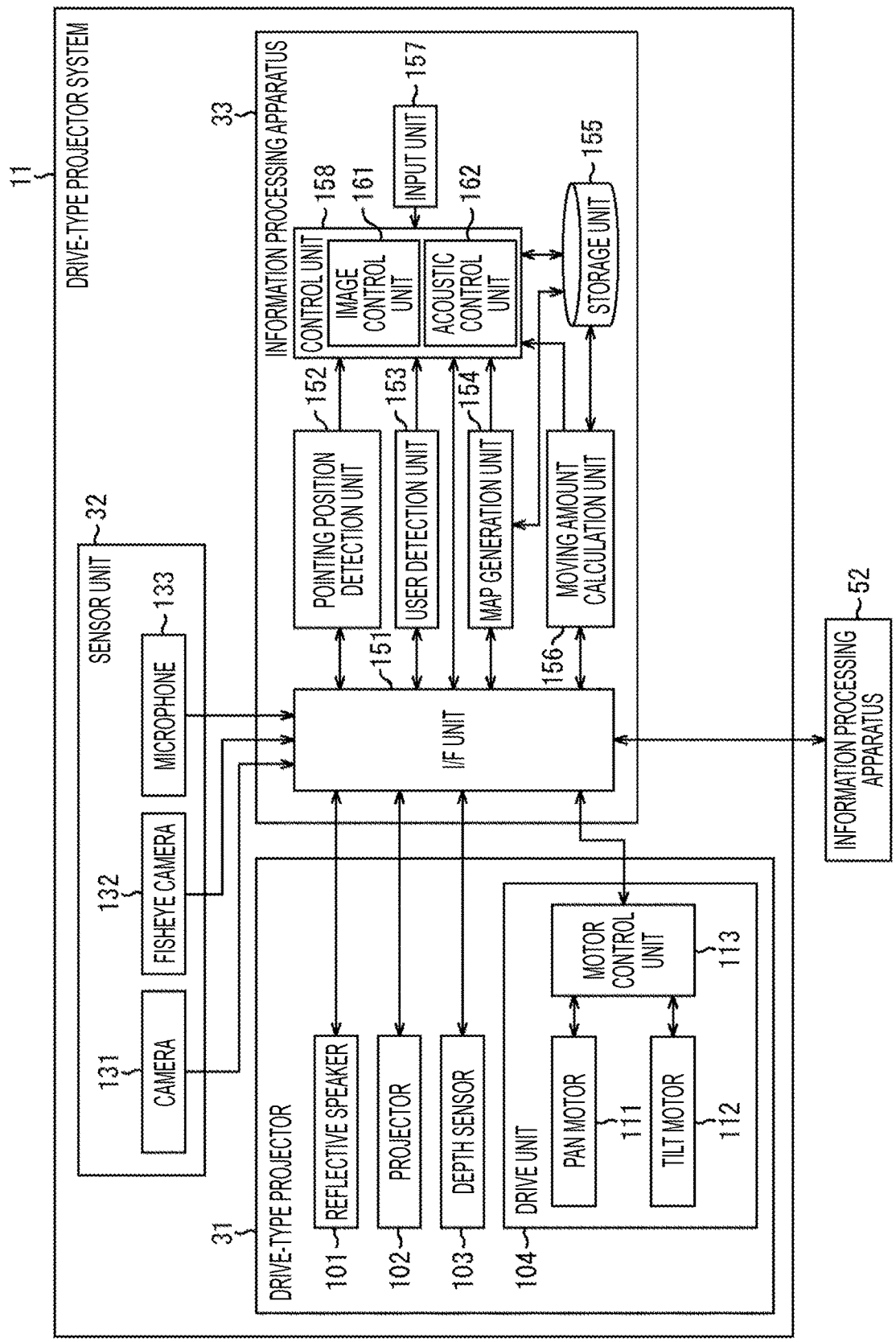
FIG. 2 is a block diagram illustrating a configuration example of a drive-type projector system.

FIG. 2 illustrates a specific configuration example of the drive-type projector system 11.

Figure 3:
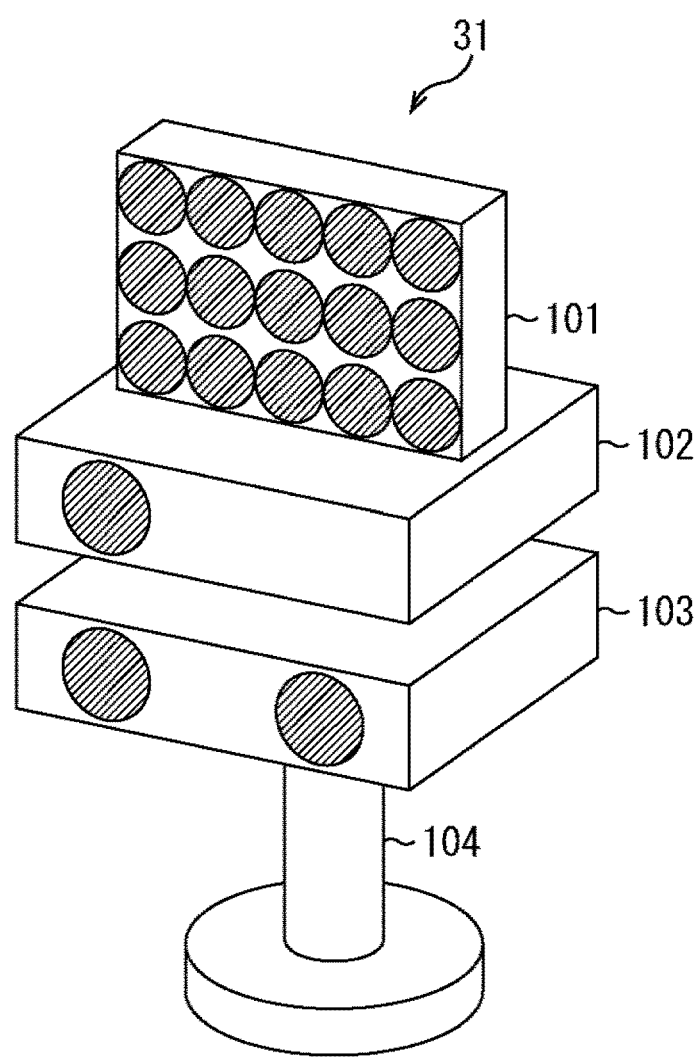
FIG. 3 is a schematic view illustrating a configuration example of an appearance of the drive-type projector.

The drive-type projector 31 includes a reflective speaker 101, a projector 102, a depth sensor 103, and a drive unit 104. As illustrated in FIG. 3, in the drive-type projector 31, the depth sensor 103 is installed on the drive unit 104, the projector 102 is installed on the depth sensor 103, and the reflective speaker 101 is installed on the projector 102.

The reflective speaker 101 is a speaker that generates a virtual sound source at a reflection position by outputting and reflecting an output sound at a desired position in the display space under control of the information processing apparatus 33. The user feels that a sound is being output from the position of the virtual sound source. The system of the reflective speaker 101 is not particularly limited as long as the reflective speaker 101 is a speaker capable of generating the virtual sound source at the reflection position. For example, the reflective speaker 101 is configured by a super directional speaker having sharp directivity.

Note that, as will be described below, in the case of creating a space map of the display space on the basis of a reflected sound with respect to the output sound of the reflective speaker 101, it is desirable to output an ultrasonic output sound from the reflective speaker 101. An example of such a speaker includes an ultrasonic speaker (parametric speaker) and the like that outputs a signal obtained by modulating a carrier wave including ultrasonic waves by a predetermined method.

Note that, hereinafter, in some cases, the reflective speaker 101 outputting the output sound toward the virtual sound source and reflecting the output sound at the virtual sound source is simply expressed as outputting a sound from the virtual sound source.

The projector 102 projects an image based on image data supplied from the information processing apparatus 33 onto a wall, an object, or the like in the display space under the control of the information processing apparatus 33. Note that the method of the projector 102 is not limited to a specific method, and any method can be adopted.

The depth sensor 103 captures a distance image indicating a distance from the drive-type projector 31 (more accurately, the depth sensor 103) at each position in the display space, using infrared light, for example, and supplies the captured distance image to the information processing apparatus 33 under the control of the information processing apparatus 33. Note that, as the method of the depth sensor 103, any method such as a time of flight (TOF) method, a pattern irradiation method, or a stereo camera method can be adopted.

The drive unit 104 controls an outputting direction of the reflective speaker 101, a projecting direction of the projector 102, and a capturing direction of the depth sensor 103 under the control of the information processing apparatus 33. The drive unit 104 includes a pan motor 111, a tilt motor 112, and a motor control unit 113.

The pan motor 111 is a motor that rotates the reflective speaker 101, the projector 102, and the depth sensor 103 in a pan direction (horizontal direction). The pan motor 111 includes an encoder and supplies, for example, detection results of a rotation speed and a rotation position of the pan motor 111 to the motor control unit 113.

The tilt motor 112 is a motor that rotates the reflective speaker 101, the projector 102, and the depth sensor 103 in a tilt direction (vertical direction). The tilt motor 112 includes an encoder and supplies, for example, detection results of a rotation speed and a rotation position of the tilt motor 112 to the motor control unit 113.

The motor control unit 113 controls rotation of the pan motor 111 and the tilt motor 112 under the control of the information processing apparatus 33. Further, the motor control unit 113 supplies control information of the drive unit 104 to the information processing apparatus 33. The control information of the drive unit 104 includes, for example, the rotation speeds and rotation positions of the pan motor 111 and the tilt motor 112.

Note that the drive unit 104 may also be configured to be rotatable in a yaw direction (around a main axis in the projecting direction of an image, for example. Further, the drive unit 104 may further include a moving mechanism such as a motor and a wheel.

The sensor unit 32 includes a camera 131, a fisheye camera 132, and a microphone 133.

The camera 131 captures an inside of the display space and supplies an image obtained as a result of capturing (hereinafter the image is referred to as a display space image) to the information processing apparatus 33. The display space image is used, for example, for detection of a position, a gaze direction, a gesture, and the like of the user in the display space.

The fisheye camera 132 is configured by a camera including a fisheye lens, and captures a super wide-angle image. The fisheye camera 132 supplies an image obtained as a result of capturing (hereinafter the image is referred to as a fisheye image) to the information processing apparatus 33. The fisheye image is used, for example, for detection of an irradiation position (pointing position) of infrared light emitted from the pointing device 71.

The microphone 133 is used, for example, for detection of the reflected sound with respect to the output sound from the reflective speaker 101. The microphone 133 supplies an audio signal indicating the detected sound to the information processing apparatus 33.

The information processing apparatus 33 includes an interface (I/F) unit 151, a pointing position detection unit 152, a user detection unit 153, a map generation unit 154, a storage unit 155, a moving amount calculation unit 156, an input unit 157, and a control unit 158.

The I/F unit 151 is configured by, for example, a communication device, a connector, and the like. The I/F unit 151 transmits and receives data and the like to and from the information processing apparatus 52, the reflective speaker 101, the projector 102, the depth sensor 103, the motor control unit 113, the camera 131, the fisheye camera 132, and the microphone 133. Further, the I/F unit 151 supplies the received data and the like to each unit of the information processing apparatus 33, and acquires data or the like to be transmitted from each unit of the information processing apparatus 33.

Note that, as a communication method of the I/F unit 151, any wired or wireless method can be adopted. Further, the communication method of the I/F unit 151 may be changed for each target with which communication is performed. Further, for example, the I/F unit 151 may directly perform communication with each communication target or may perform communication via a network or the like.

The pointing position detection unit 152 detects the pointing position by the pointing device 71 on the basis of the fisheye image captured by the fisheye camera 132. The pointing position detection unit 152 supplies a detection result to the control unit 158.

Note that any method can be adopted as the detection method of the pointing position detection unit 152.

The user detection unit 153 detects, for example, the position, the gaze direction, the gesture, and the like of the user in the display space on the basis of the display space image captured by the camera 131. The user detection unit 153 supplies a detection result to the control unit 158.

Note that any method can be adopted as the detection method of the user detection unit 153.

The map generation unit 154 controls the depth sensor 103 and the motor control unit 113 via the I/F unit 151 to control capturing of the distance image in the display space by the depth sensor 103. Then, the map generation unit 154 performs space recognition of the inside of the display space using the distance image, and generates a first space map indicating a three-dimensional shape of an object, a wall, and the like in the display space. The first space map includes, for example, a three-dimensional point group map and includes depth information indicating the distance from the drive-type projector 31 at each position in the display space.

Further, the map generation unit 154 controls the reflective speaker 101 and the motor control unit 113 via the I/F unit 151 to control scanning of the output sound from the reflective speaker 101 in the display space. Then, the map generation unit 154 performs space recognition of the inside of the display space on the basis of a detection result of the reflected sound detected by the microphone 133 when the output sound is scanned in the display space, and generates a second space map indicating a three-dimensional shape of an object, a wall, and the like in the display space. The second space map includes, for example, a three-dimensional point group map, and includes the depth information indicating the distance from the drive-type projector 31 at each position in the display space, and reflection characteristic information indicating reflection characteristics of each position (for example, reflectance, an reflection angle, and the like).

Further, the map generation unit 154 generates an integrated space map obtained by integrating the first space map and the second space map. The integrated space map includes, for example, the depth information indicating the distance from the drive-type projector 31 at each position in the display space, the reflection characteristic information indicating reflection characteristics of each position, and display characteristic information indicating availability of display of an image (availability of projection of the image) at each position in the display space. Further, the integrated space map includes, for example, image position information indicating a display position of an image set in advance to the display space. The map generation unit 154 causes the storage unit 155 to store the generated integrated space map, and supplies the generated integrated space map to the information processing apparatus 52 via the I/F unit 151.

Further, the map generation unit 154 detects the position of the microphone 133 and the like on the basis of the first space map, for example. The map generation unit 154 supplies a detection result to the control unit 158.

Note that, for example, the position of the microphone 133 and the like may be detected on the basis of the display space image captured by the camera 131.

The moving amount calculation unit 156 calculates or predicts a moving direction and a moving amount of the projection area of the projector 102 on the basis of the control information of the drive unit 104. The moving amount calculation unit 156 supplies a calculation result or a prediction result of the moving direction and the moving amount of the projection area to the control unit 158.

The input unit 157 is configured by, for example, an operation device and the like, and is used for input of commands, data (for example, image data and audio data), and the like to the control unit 158.

The control unit 158 includes an image control unit 161 and an acoustic control unit 162.

The image control unit 161 controls display of an image by the drive-type projector 31. For example, the image control unit 161 controls the projector 102 via the I/F unit 151 to control content and display timing of the image to be displayed, and the like. Further, the image control unit 161 controls, for example, a display image range on the basis of the calculation result or the prediction result of the moving direction and the moving amount of the projection area of the projector 102. Here, the display image range is a range of an image to be displayed within the projection area, of an image set to be displayed within the display space. Further, for example, the image control unit 161 controls cooperation of an image of the drive-type projector 31 and an image of a fixed-type projector 51 in conjunction with the information processing apparatus 52 via the I/F unit 151.

Further, for example, the image control unit 161 controls the motor control unit 113 via the I/F unit 151 to control the projecting direction of the image of the projector 102 and the outputting direction of the reflective speaker 101, thereby to control the display position of the image and the reflection position of the output sound (that is, the position of the virtual sound source).

The acoustic control unit 162 controls the output of the output sound of the reflective speaker 101. For example, the acoustic control unit 162 controls the reflective speaker 101 via the I/F unit 151 to control content, a volume, output timing, and the like of the output sound.

Note that, hereinafter, description of the I/F unit 151 is appropriately omitted for easy understanding of description. For example, when the image control unit 161 supplies the image data to the projector 102 via the I/F unit 151, it is merely described that the image control unit 161 supplies the image data to the projector 102.

{Configuration Example of Fixed-Type Projector System 12}

Figure 4:
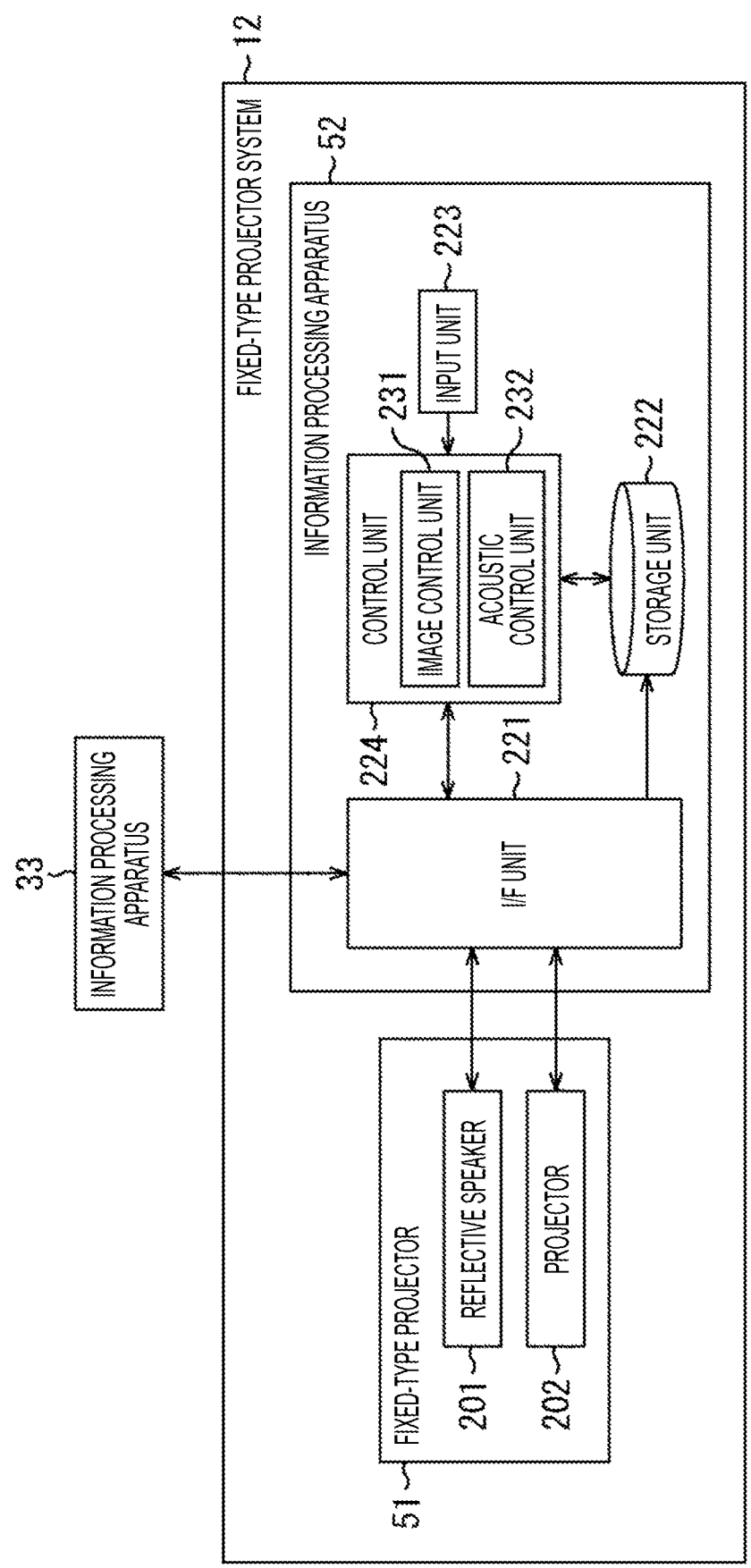
FIG. 4 is a block diagram illustrating a configuration example of a fixed-type projector system.

FIG. 4 illustrates a specific configuration example of the fixed-type projector system 12.

The fixed-type projector 51 includes a reflective speaker 201 and a projector 202.

The reflective speaker 201 is a speaker that generates a virtual sound source at a reflection position by outputting and reflecting an output sound at a desired position in the display space under control of the information processing apparatus 52, similarly to the reflective speaker 101 of the drive-type projector 31. For example, the reflective speaker 101 is set to generate the virtual sound source by outputting the output sound into the projection area of the projector 202.

The projector 202 projects an image based on image data supplied from the information processing apparatus 52 onto a wall or the like in the display space under the control of the information processing apparatus 52. Note that the method of the projector 202 is not limited to a specific method, and any method can be adopted.

The information processing apparatus 52 includes an interface (I/F) unit 221, a storage unit 222, an input unit 223, and a control unit 224.

The I/F unit 221 is configured by, for example, a communication device, a connector, and the like. The I/F unit 221 transmits and receives data and the like to and from the information processing apparatus 33, the reflective speaker 201, and the projector 202. Further, the I/F unit 221 supplies the received data and the like to each unit of the information processing apparatus 52, and acquires data or the like to be transmitted from each unit of the information processing apparatus 52.

Note that, as a communication method of the I/F unit 221, any wired or wireless method can be adopted. Further, the communication method of the I/F unit 221 may be changed for each target with which communication is performed. Further, for example, the I/F unit 221 may directly perform communication with each communication target or may perform communication via a network or the like.

The storage unit 222 stores, for example, the integrated space map and the like supplied from the information processing apparatus 33.

The input unit 223 is configured by, for example, an operation device and the like, and is used for input of commands, data (for example, image data and audio data), and the like to the control unit 224.

The control unit 224 includes an image control unit 231 and an acoustic control unit 232.

The image control unit 231 controls display of an image by the projector 202. For example, the image control unit 231 controls the projector 202 via the I/F unit 221 to control content and display timing of the image to be displayed, and the like. Further, for example, the image control unit 231 performs communication with the information processing apparatus 33 via the I/F unit 221, and controls cooperation of an image of the fixed-type projector 51 and an image of the drive-type projector 31.

The acoustic control unit 232 controls an output of an output sound of the reflective speaker 201. For example, the acoustic control unit 232 controls the reflective speaker 201 via the I/F unit 221 to control content, a volume, output timing, and the like of the output sound.

Note that, hereinafter, description of the I/F unit 221 is appropriately omitted for easy understanding of description. For example, when the image control unit 231 supplies the image data to the projector 202 via the I/F unit 221, it is merely described that the image control unit 231 supplies the image data to the projector 202.

{Processing of AV System 10}

Next, the processing of the AV system 10 will be described with reference to FIGS. 5 to 15.

(Space Map Generation Processing)

Figure 5:
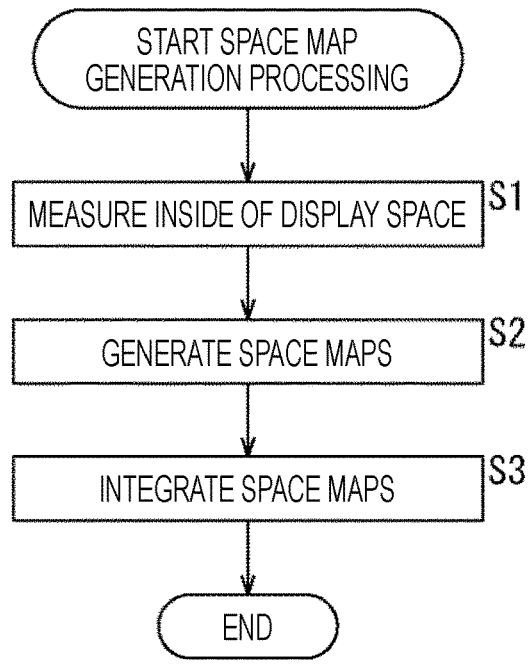
FIG. 5 is a flowchart for describing space map generation processing executed by the AV system.

First, the space map generation processing executed by the AV system 10 will be described with reference to the flowchart in FIG. 5.

Note that this processing is started, for example, when the drive-type projector 31 is installed or when the installation position of the drive-type projector 31 is moved. Movement of the installation position of the drive-type projector 31 can be detected on the basis of the display space image captured by the camera 131 or by providing an acceleration sensor, a gyro sensor, or the like in the drive-type projector 31, for example.

In addition, for example, when the state of the display space is changed on the basis of the display space image captured by the camera 131, the space map generation processing may be started. As the change of the state of the display space, for example, movement of a movable part in the display space (for example, opening or closing of a door, a window, a curtain, or the like), entering or exiting of a person into or from the display space, or the like is assumed.

In step S1, the AV system 10 measures the inside of the display space. To be specific, the map generation unit 154 controls the motor control unit 113 to rotate the drive unit 104 in the pan direction and the tilt direction, and causes the depth sensor 103 to scan all of areas in the display space and to scan the output sound (ultrasonic signal) output from the reflective speaker 101 in all of areas in the display space.

With the scanning, all the areas in the display space are captured by the depth sensor 103, and the distance image indicating the distance of each area from the depth sensor 103 is obtained. The depth sensor 103 supplies the captured distance image to the map generation unit 154. Further, the reflected sounds with respect to the output sounds from all the areas in the display space are detected by the microphone 133. The microphone 133 supplies the audio signals indicating the detection results to the map generation unit 154.

In step S2, the map generation unit 154 generates the space map. To be specific, the map generation unit 154 generates the first space map on the basis of the distance image captured by the depth sensor 103. The first space map includes the depth information indicating the distance from the drive-type projector 31 at each position in the display space.

Note that, since the depth sensor 103 uses reflection of infrared light, depth information of an area where reflection of infrared light cannot be used, such as a black wall, concrete, glass, or the like, is lacked in the first space map.

Further, the map generation unit 154 detects the positions of the microphone 133 and the like in the display space on the basis of the first space map. The map generation unit 154 supplies a detection result to the control unit 158.

Further, the map generation unit 154 generates the second space map on the basis of the audio signal from the microphone 133. To be specific, the map generation unit 154 calculates the distances from the reflective speaker 101 and the microphone 133 to each position in the display space on the basis of the outputting direction of the output sound, the positions of the reflective speaker 101 and the microphone 133, and a time from when the output sound is output to when the reflected sound is received.

Figure 6:
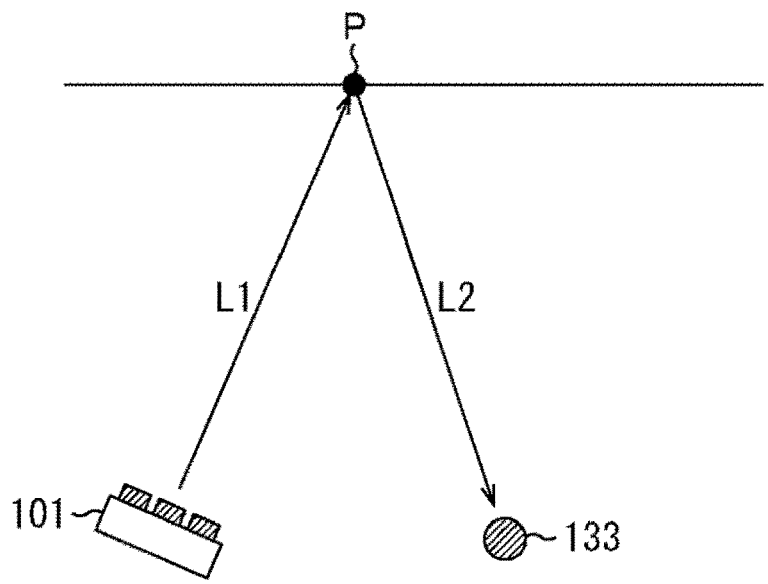
FIG. 6 is a view for describing a method of calculating reflectance.

Further, the map generation unit 154 calculates the reflectance of each position in the display space on the basis of the volume of the reflected sound. For example, a case in which the output sound output from the reflective speaker 101 is reflected at a reflection position P, and the reflected sound of the output sound is detected by the microphone 133, as illustrated in FIG. 6, will be described. Note that, hereinafter, the distance between the reflective speaker 101 and the reflection position P is L1, and the distance between the reflection position P and the microphone 133 is L2.

Here, in the case of assuming that all the output sound is reflected in the direction of the microphone 133 without being attenuated (in the case of assuming that the reflectance is 100%) at the reflection position P, an attenuation amount of the reflected sound detected by the microphone 133 with respect to the output sound can be estimated on the basis of the distance L1+the distance L2. Hereinafter, the attenuation amount in this case is referred to as a reference attenuation amount.

Meanwhile, in reality, the output sound is diffused or absorbed at the reflection position P, and thus the volume of the reflected sound reflected in the direction of the microphone 133 is small. Therefore, the map generation unit 154 estimates the reflectance of the reflection position P according to a ratio of the attenuation amount of the reflected sound actually detected by the microphone 133 with respect to the output sound, and the reference attenuation amount.

Then, the map generation unit 154 generates the second space map including the depth information indicating the distance from the drive-type projector 31 at each position in the display space, and the reflection characteristic information indicating the reflectance of each position in the display space.

Note that the depth information of the area can be obtained in an area where reflection of the output sound (ultrasonic signal) can be used, even if the area lacks the depth information in the first space map because reflection of infrared light cannot be used.

In step S3, the map generation unit 154 integrates the space maps. To be specific, the map generation unit 154 supplements the depth information of the area where the depth information is lacked in the first space map with the depth information of the second space map.

Further, the map generation unit 154 generates the display characteristic information indicating whether an image is displayable at each position in the display space. For example, the map generation unit 154 determines that a position where the depth information is obtained in the first space map is a position where an image is displayable. Meanwhile, the map generation unit 154 estimates hardness and surface material of the position where the depth information is lacked in the first space map on the basis of the reflection characteristic information of the second space map. Then, the map generation unit 154 determines whether an image is displayable at the position where the depth information is lacked in the first space map on the basis of the estimated hardness and surface material. With the determination, for example, a position where projection of an image is difficult, such as a black wall, concrete, or glass, is determined as a position where display of the image is difficult.

Note that the map generation unit 154 may determine all the positions where the depth information is lacked in the first space map as the positions where display of an image is difficult.

Further, the map generation unit 154 uses the reflection characteristic information of each position in the display space, of the second space map, as reflection characteristic information of the integrated space map as it is.

In this way, the map generation unit 154 generates the integrated space map including the depth information, the display characteristic information, and the reflection characteristic information of each position in the display space.

Further, the map generation unit 154 adds the image position information indicating a display position of an image set in advance to the display space to the integrated space map, as needed. In the image position information, for example, content of the image set to be displayed at each position in the display space is indicated. Note that, when the image displayed in the display space is a moving image, for example, content of the image set to be displayed at each position is indicated in the image position information in chronological order.

The map generation unit 154 causes the storage unit 155 to store the generated integrated space map. Further, the map generation unit 154 supplies the integrated space map to the information processing apparatus 52. The storage unit 222 of the information processing apparatus 52 stores the supplied integrated space map.

After that, the space map generation processing is terminated.

Note that, for example, information indicating that the space map is being generated may be output with an image, a sound, or the like from the drive-type projector 31 during generation of the space map.

(Display Control Processing)

Next, display control processing executed by the AV system 10 will be described with reference to FIGS. 7 to 15. Note that, hereinafter, processing when an image of the drive-type projector 31 and an image of the fixed-type projector 51 are made to cooperate will be mainly described.

Further, hereinafter, the image and the projection area of the fixed-type projector 51 are referred to as a fixed image and a fixed projection area, and the image and the projection area of the drive-type projector 31 are referred to as a drive image and a drive projection area, as needed.

For example, the AV system 10 can freely move the projection area (drive projection area) of the drive-type projector 31 in the display space while fixing the projection area (fixed projection area) of the fixed-type projector 51 to a predetermined position in the display space.

Figure 7:
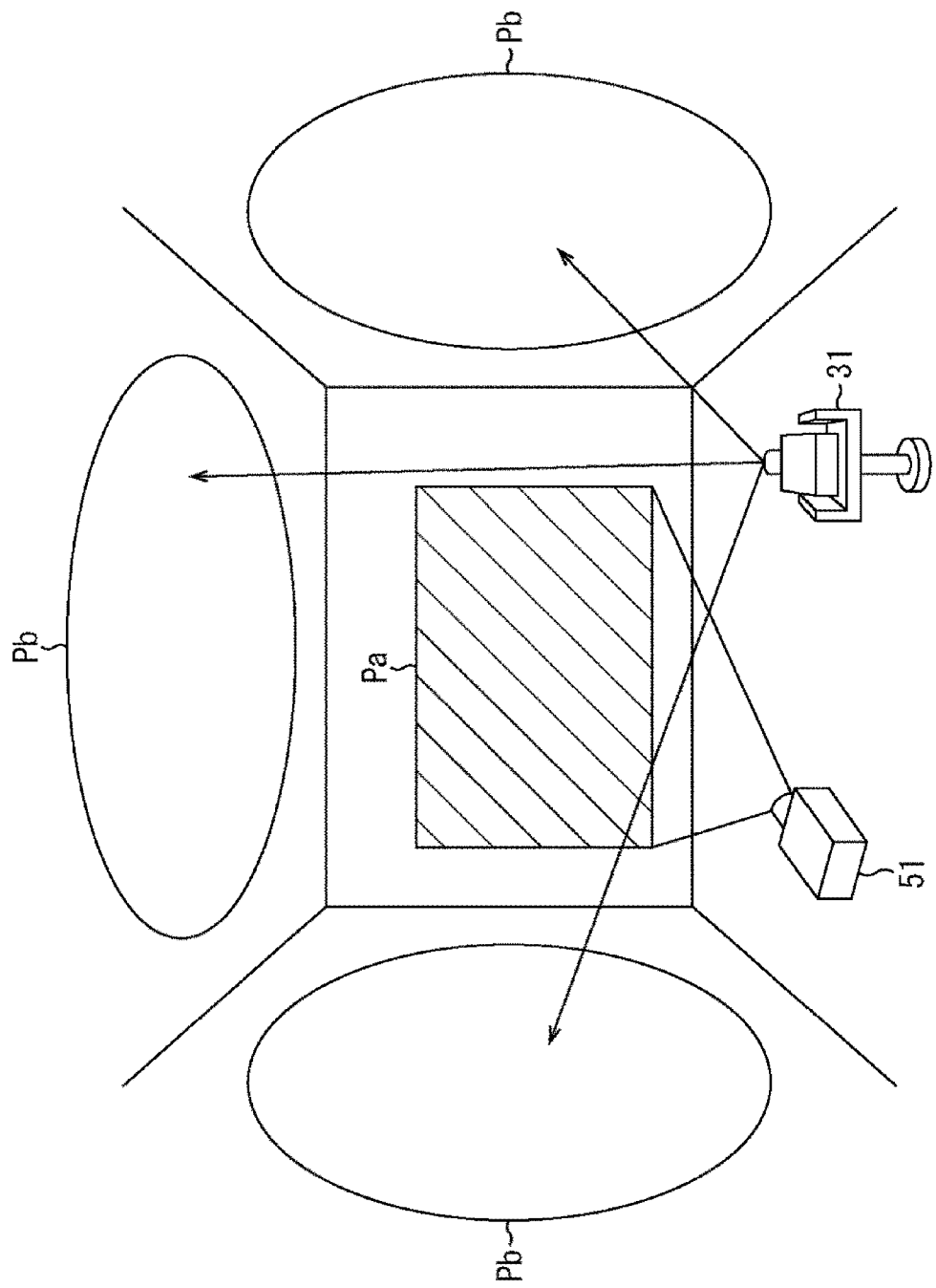
FIG. 7 is a view illustrating an example of a relationship between a fixed projection area and a drive projection area.

For example, as illustrated in FIG. 7, the AV system 10 fixes a fixed projection area Pa to a predetermined surface in the display space, and can freely move a drive projection area Pb to surfaces other than the surface to which the fixed projection area Pa is set. With the configuration, the AV system 10 can realize a free image expression without restriction of the angle of view, with the drive image of the drive-type projector 31, while providing the user with an image experience in a specific direction with high resolution and high luminance, with the fixed image of the fixed-type projector 51, for example.

Figure 8:
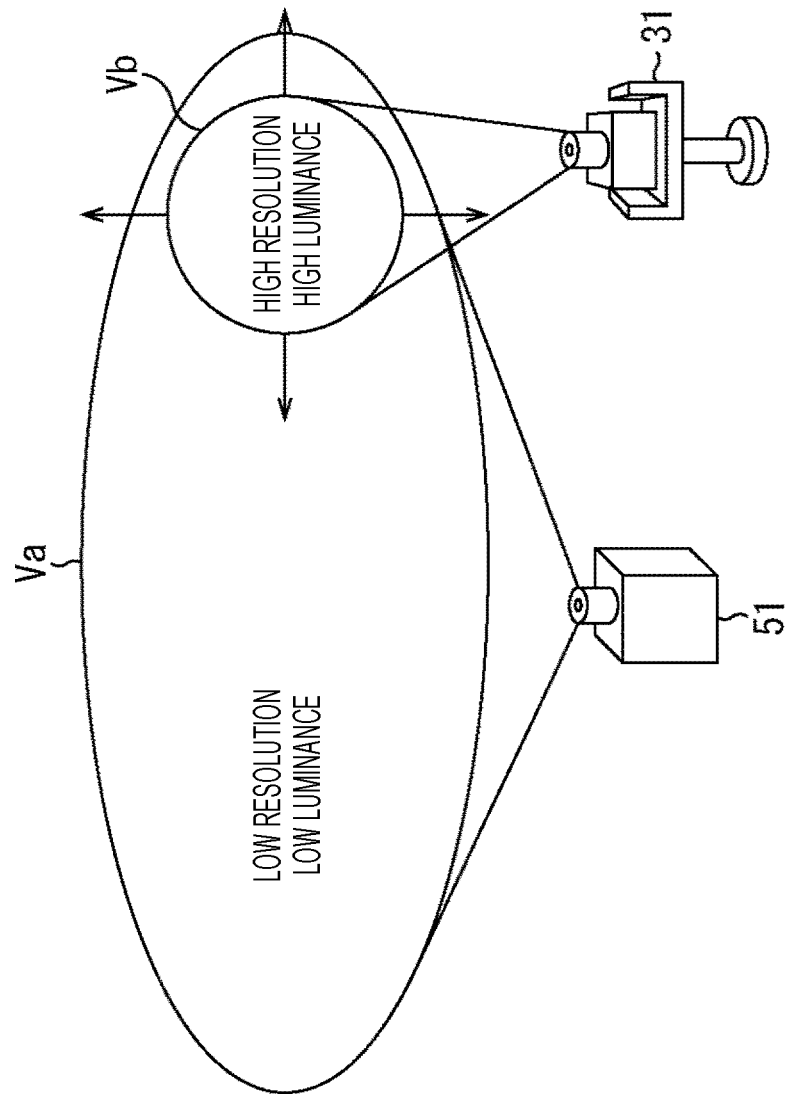
FIG. 8 is a view illustrating a first example of a relationship between a fixed image and a drive image.

Further, for example, as illustrated in FIG. 8, (the projector 202 of) the fixed-type projector 51 is configured by an omnidirectional-type projector, and the fixed-type projector 51 projects a fixed image Va with low resolution and low luminance to a large range in the display space. Meanwhile, the drive-type projector 31 projects a drive image Vb with high resolution and high luminance in the fixed image Va with low resolution and low luminance under control of the image control unit 161. With the projection, the AV system 10 can attract the user's attention to a predetermined position in the fixed image Va and can supplement information regarding contents in the fixed image Va, with the drive image Vb, while providing a sense of being surrounded with the fixed image Va, for example.

Figure 9:
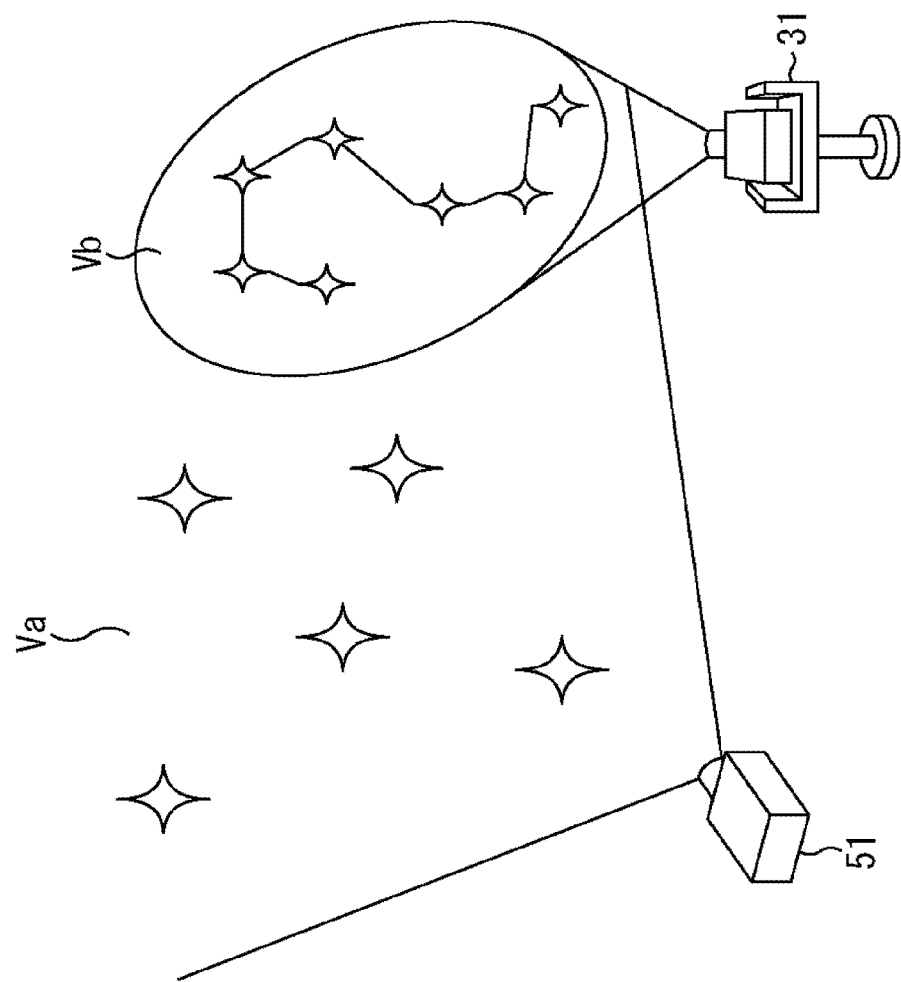
FIG. 9 is a view illustrating an example of a case in which a planetarium is realized by the AV system.

For example, as illustrated in FIG. 9, an example of a case of realizing a planetarium by the AV system 10 will be described. For example, the fixed-type projector 51 displays the fixed image Va of an entire starry sky in the display space with low resolution and low luminance in the whole sky under the control of the image control unit 231. Meanwhile, the drive-type projector 31 moves the drive image Vb with high resolution and high luminance in the fixed image Va under the control of the image control unit 161. For example, the drive-type projector 31 displays the drive image Vb indicating a constellation that is a target to be explained, at a position corresponding to the constellation in the fixed image Va, with high resolution and high luminance. The display can bring the user to the attention of the constellation.

Note that, if the image effect is realized only by the fixed-type projector 51, the projector 202, which is an omnidirectional-type projector, needs to have high resolution and high luminance. Therefore, the cost for the device, installation work, and the like rises.

Meanwhile, by use of the drive-type projector 31, the specification of the resolution and the luminance of the projector 202, which is an omnidirectional-type projector, can be lowered. As a result, the cost for the device, installation work, and the like can be reduced.

Note that an image that is the same as the fixed image in the area where the drive image is displayed is not necessarily displayed with high resolution and high luminance with a drive image. For example, an image related to the image displayed with the fixed image may be displayed with the drive image in or near the drive projection area of the drive-type projector 31.

For example, the fixed-type projector 51 displays a fixed image of a world map in the display space with low resolution and low luminance in the whole sky under the control of the image control unit 231. Meanwhile, the drive-type projector 31 displays an image related to a country displayed in or near the drive projection area in the fixed image of the world map, with high resolution and high luminance, with the drive image, under control of the image control unit 161. The display can bring the user to the attention of the country in the world map, and can provide the user with detailed information regarding the country.

Note that, in the above description, an example of setting the drive image to have higher resolution and higher luminance than the fixed image. However, only one of the resolution and the luminance of the drive image may be set to be higher than that of the fixed image. Further, for example, characteristics (for example, a localization position in the depth direction, a geometric correction value, a frame rate, a color, a display size, and the like) other than the resolution and the luminance may be set to different values between the fixed image and the drive image. Note that the types of the characteristics set to different values between the fixed image and the drive image can be arbitrarily set according to the image effect to be realized and the like.

Figure 10:
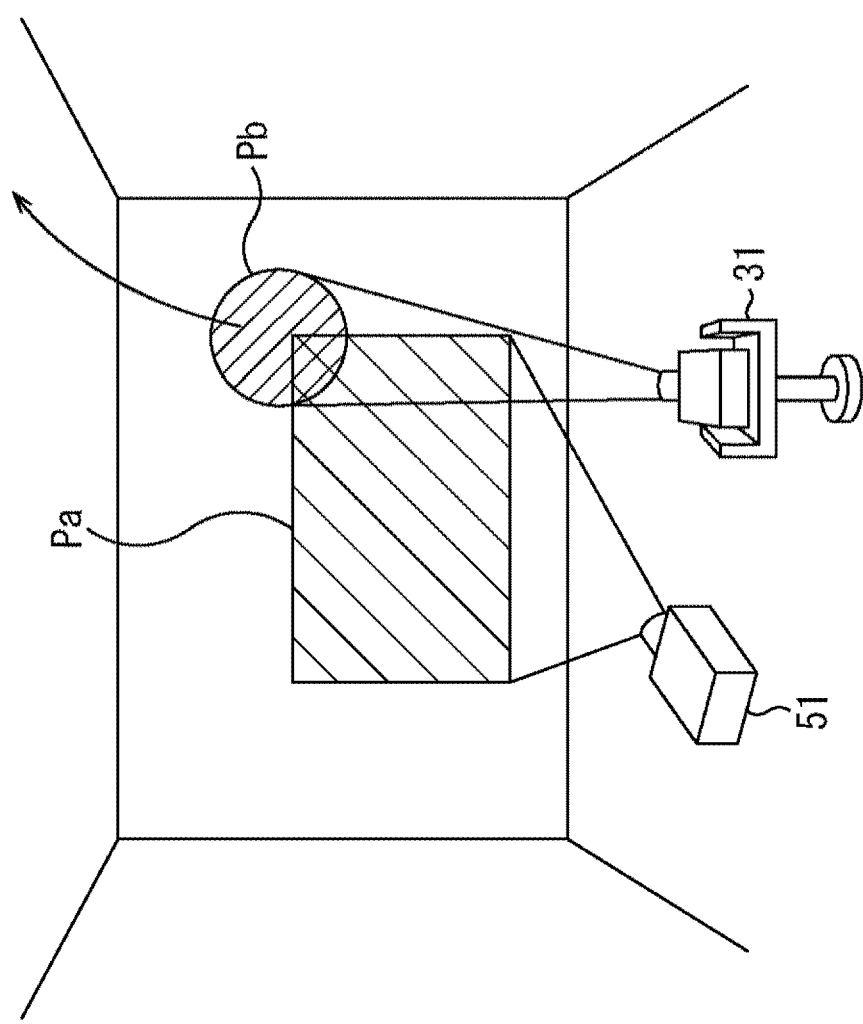
FIG. 10 is a view illustrating a second example of the relationship between a fixed image and a drive image.

Further, as illustrated in FIG. 10, the AV system 10 can easily realize an effect to cause a specific image in the fixed projection area Pa to fly out by moving the drive projection area Pb from the inside to the outside of the fixed projection area Pa, for example.

Here, an example of a realization method of a case of moving a specific image in the fixed projection area to the outside of the fixed projection area, with the drive image, will be described with reference to FIGS. 11 to 15.

For example, a case of moving an image V1 that is an image to be moved in the fixed projection area Pa to the outside of the fixed projection area Pa, with the drive image, will be described with referenced to FIG. 11.

Figure 11:
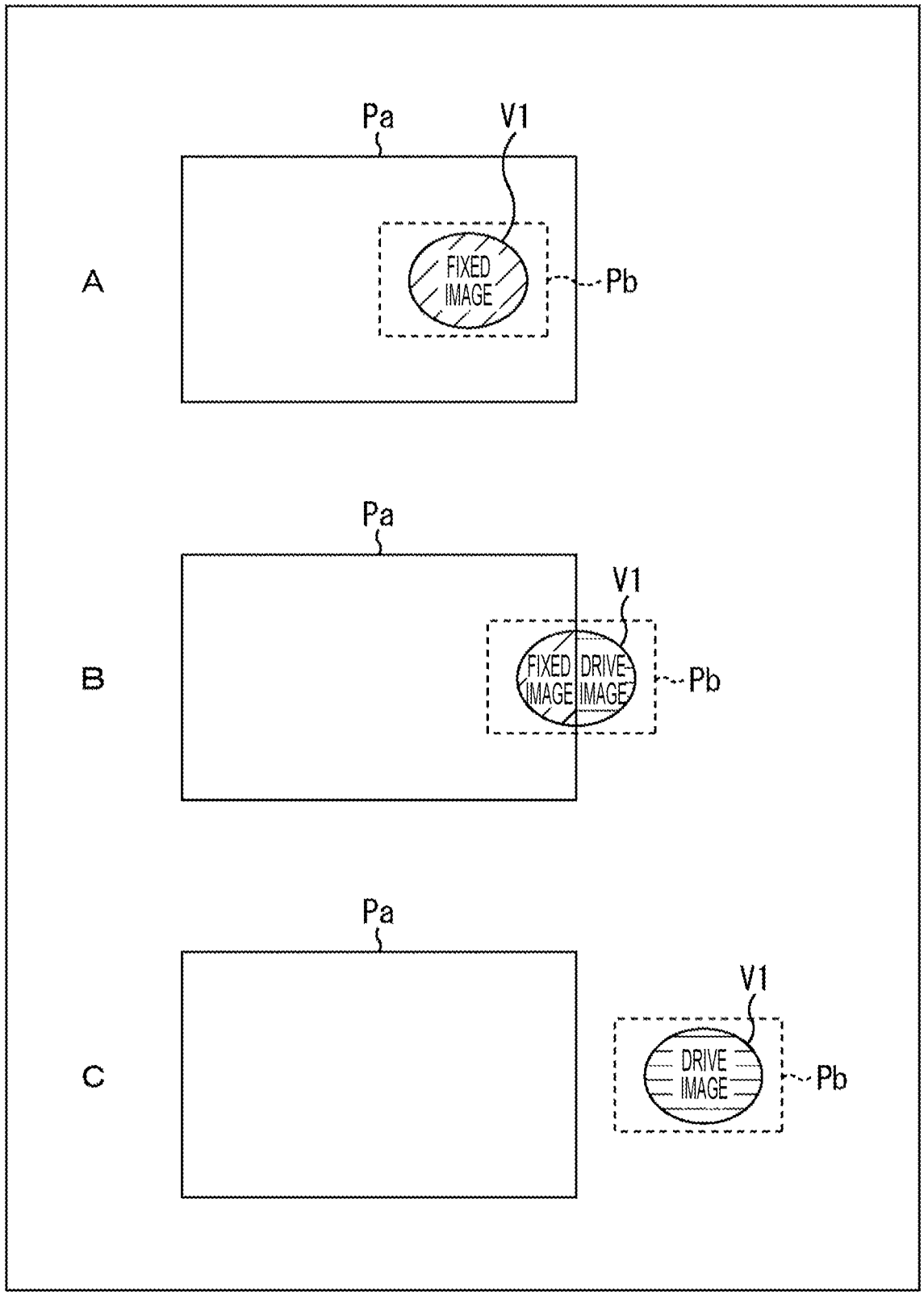
FIG. 11 is a diagram for describing a method of moving an image in the fixed projection area to an outside of the fixed projection area.

First, as illustrated in A in FIG. 11, the drive-type projector 31 moves the drive projection area Pb to the area where the image V1 is displayed in the fixed projection area Pa under the control of the image control unit 161. At this time, the drive-type projector 31 does not project an image and displays nothing in the drive projection area Pb. Therefore, the image V1 is displayed with the fixed image.

After that, the drive-type projector 31 does not project an image and displays nothing in the drive projection area Pb during a period in which the entire drive projection area Pb is included in the fixed projection area Pa. Therefore, the image V1 is displayed with the fixed image, and the position of the image V1 is moved with the fixed image in the fixed projection area Pa.

Next, as illustrated in B in FIG. 11, when a part of the drive projection area Pb moves out from the fixed projection area Pa, the fixed-type projector 51 displays an image in the fixed projection area Pa, of the image V1, with the fixed image, under the control of the image control unit 231, for example. Meanwhile, the drive-type projector 31 displays an image outside the fixed projection area Pa, of the image V1, with the drive image, under the control of the image control unit 161.

Next, as illustrated in C in FIG. 11, when the drive projection area Pb moves out of the fixed projection area Pa, the drive-type projector 31 displays the image V1 in the drive projection area Pb with the drive image under the control of the image control unit 161.

In this manner, the AV system 10 can move the image V1 in the fixed projection area Pa to the outside of the fixed projection area Pa.

Note that, in the example of FIG. 11, an example of displaying the image to be moved in the fixed projection area, with the fixed image, has been described. However, the display of the image to be moved may be switched from the fixed image to the drive image in the fixed projection area. In other words, in the fixed projection area, the display of the image to be moved may be taken over from the fixed-type projector 51 to the drive-type projector 31.

Here, processing of a case of switching an image in a fixed projection area will be described with reference to the flowchart in FIG. 12. Note that, hereinafter, a projector system that projects an image before switching is referred to as a parent projector, and a projector system that projects an image after switching is referred to as a child projector. Further, hereinafter, a case in which the fixed-type projector system 12 is the parent projector and the drive-type projector system 11 is the child projector will be described.

Figure 13:
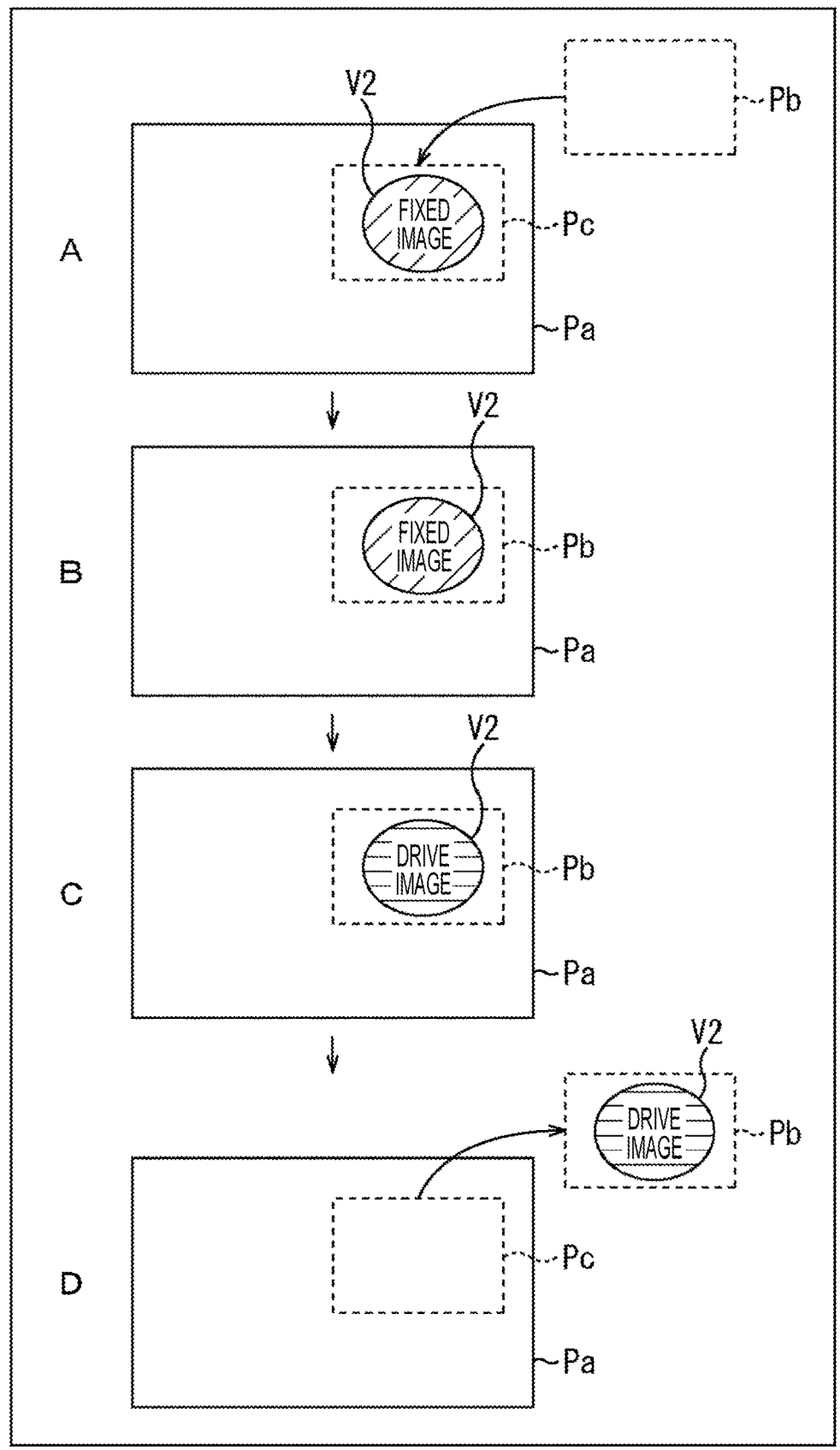
FIG. 13 is a diagram for describing a method of switching display of an image.

Note that, hereinafter, as illustrated in FIG. 13, a case of moving an image V2 to the outside of the fixed projection area Pa after switching display of the image V2 in the fixed projection area Pa will be described.

In step S101, the child projector moves the projection area. For example, as illustrated in A in FIG. 13, the drive-type projector 31 moves the drive projection area Pb to an area Pc where the image V2 is displayed in the fixed projection area Pa under the control of the image control unit 161. At this time, the image control unit 161 performs control not to project an image from the projector 102. With the control, the state in which the image V2 is continuously displayed with the fixed image in the area Pc.

In step S102, the child projector transmits an image takeover request command. To be specific, the image control unit 161 of the drive-type projector system 11 generates the image takeover request command, and transmits the generate command to the image control unit 231 of the fixed-type projector system 12.

The image takeover request command includes setting values of the characteristics of the image V2 at the takeover, for example. The characteristics of the image V2 include projection positions (space coordinates and a display position), the projection position, the localization position in the depth direction, the luminance, the resolution, the geometric correction value, the frame rate, the color, the display size, and the like, of the image, for example. Note that the localization position in the depth direction refers to a localization position in the depth direction with respect to a plane (projection plane) on which a three-dimensional image is projected, when the image V2 is a three-dimensional image. For example, the value of the localization position in the depth direction is set to 0 when the localization position of the three-dimensional image is set on the projection plane. The value of the localization plane in the depth direction is set to a positive value when the localization position is set to a position in front of the projection plane, and is set to a negative value when the localization plane is set behind the projection plane.

Note that, when at least one of the drive-type projector 31 and the fixed-type projector 51 does not support the display of the three-dimensional image, the setting value of the localization position in the depth direction of the image V2 is set to 0 (that is, the projection plane), for example.

Further, the image control unit 161 performs setting of the drive-type projector 31 to start the display of the image V2 with the characteristics described in the image takeover request command.

In step S121, the parent projector receives the image takeover request command. To be specific, the image control unit 231 of the fixed-type projector system 12 receives the image takeover request command transmitted from the image control unit 161 of the drive-type projector system 11. With the reception, the image control unit 231 acquires the setting values of the characteristics of the image V2.

In step S122, the parent projector adjusts the characteristics of the image. To be specific, the image control unit 231 of the fixed-type projector system 12 adjusts the characteristics of the image V2 projected from the projector 202 to the setting values described in the image takeover request command. That is, the image control unit 231 sets the projection position, the localization position in the depth direction, the luminance, the resolution, the geometric correction value, the frame rate, the color, the display size, and the like of the image V2 in the fixed projection area Pa of B in FIG. 13 to the setting values described in the image takeover request command. With the setting, the characteristics of the image V2 by the fixed-type projector 51 are adjusted to the characteristics of the V2 by the drive-type projector 31.

At this time, for example, two cases are considered in which a target to be set to the characteristics described in the image takeover request command is limited only to the image V2, and includes other areas (for example, the entire fixed image). Which is to be selected is determined according to content of the image, an image effect to be provided to the user, or the like, for example.

In step S123, the parent projector transmits a preparation completion notification command. To be specific, the image control unit 231 of the fixed-type projector system 12 generates the preparation completion notification command, and transmits the generated preparation completion notification command to the image control unit 161 of the drive-type projector system 11.

In step S103, the child projector receives the preparation completion notification command. To be specific, the image control unit 161 of the drive-type projector system 11 receives the preparation completion notification command transmitted from the image control unit 231 of the fixed-type projector system 12.

In step S124, the parent projector erases the image in synchronization with the child projector. On the other hand, in step S104, the child projector displays the image in synchronization with the parent projector.

To be specific, the fixed-type projector 51 gradually erases the image V2 in the fixed projection area Pa under the control of the image control unit 231. Meanwhile, the drive-type projector 31 starts projection of the image V2 into the drive projection area Pb in synchronization with the erasure of the image V2 in the fixed projection area Pa under the control of the image control unit 161. With the process, the display of the image V2 is switched from the fixed image to the drive image, as illustrated in C in FIG. 13.

In this manner, when the relationship between the image V2 by the fixed-type projector 51 and the image V2 by the drive-type projector 31 satisfies a predetermined condition, the projection of the image V2 by the fixed-type projector 51 is stopped and the projection of the image V2 by the drive-type projector 31 is started. To be more specific, when the characteristics of the image V2 by the fixed-type projector 51 and the characteristics of the image V2 by the drive-type projector 31 match, the projection of the image V2 by the fixed-type projector 51 is stopped and the projection of the image V2 by the drive-type projector 31 is started.

After that, the processing at the time of switching the image of the parent projector is terminated.

In step S105, the child projector moves the image. To be specific, the drive-type projector 31 starts movement of the position of the drive projection area Pb under the control of the image control unit 161. With the movement, as illustrated in D in FIG. 13, the image V2 is moved outside the fixed image area Pa, for example.

After that, the processing at the time of switching the image of the child projector is terminated.

For example, if the characteristics of both the images of the parent projector and of the child projector do not match when display of the image is switched from the parent projector to the child projector, the image is drastically changed when the display is switched and may provide feeling of strangeness and discomfort to the user.

Figure 14:
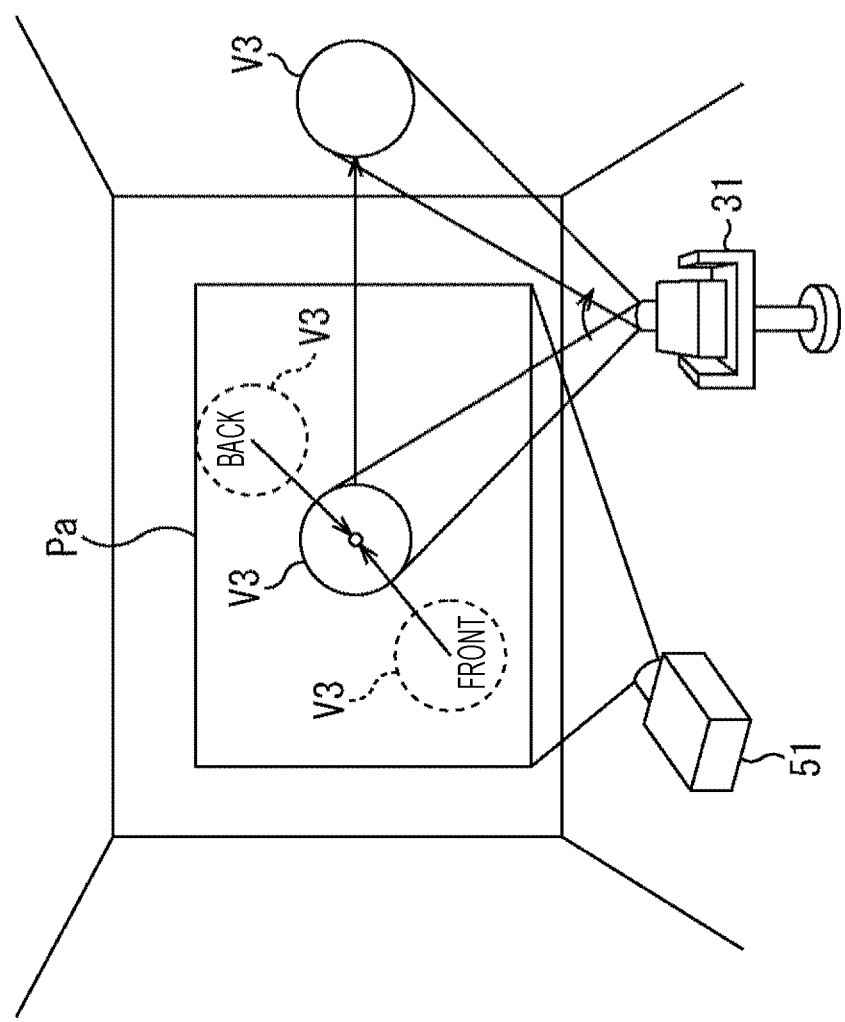
FIG. 14 is a view for describing a method of switching a three-dimensional image to a two-dimensional image.

For example, as schematically illustrated in FIG. 14, a case of switching a three-dimensional image (stereoscopic image or stereoscopy) V3 displayed by the fixed-type projector 51 (parent projector) in the fixed image area Pa to a two-dimensional image V3 by the drive-type projector 31 (child projector), and then moving the two-dimensional image V3 to the outside of the fixed image area Pa will be described.

In this case, when the display of the image V3 is switched from the fixed image to the drive image, the localization position in the depth direction of the image V3 is sometimes drastically changed from the front or the back of the projection plane to the projection plane. As a result, the convergence angle with respect to the image V3 is drastically changed, and the user feels as if the image V3 suddenly retracts from the front or suddenly jumps out from the back.

With the feeling, the load on the user's vision becomes large, which may provide feeling of discomfort or may cause visual sickness, for example.

On the other hand, as described above, by causing the characteristics of both the images of the parent projector and of the child projector to match when display of the image is switched from the parent projector to the child projector, the display of the image can be smoothly changed without being noticed by the user and without providing the feeling of strangeness and discomfort to the user. As a result, the effect obtained by causing the projection areas of the parent projector and the child projector to overlap and displaying the image can be enhanced.

For example, after the fixed-type projector 51 adjusts the localization position in the depth direction of the three-dimensional image V3 to the projection plane, the drive-type projector 31 starts display of the two-dimensional image V3. As a result, the three-dimensional image V3 can be switched to the two-dimensional image V3 without being noticed by the user and without providing the feeling of strangeness and discomfort to the user.

Here, adjusting the localization position in the depth direction of the image V3 to the projection plane means eliminating the binocular parallax of the image V3 on the projection plane, for example. Further, the binocular parallax is, for example, a difference in appearance between a left-eye image and a right-eye image corresponding to the image V3, or a difference in the display positions.

Note that the same applies to the case of switching the display from the two-dimensional image to the three-dimensional image. That is, the AV system 10 adjusts the localization position in the depth direction of the three-dimensional image after switching to the projection plane before projection.

Further, in the case of three-dimensionally displaying the image V3 by both the fixed-type projector 51 and the drive-type projector 31, the localization position in the depth direction of the image V3 at the time of the switching is not necessarily adjusted to the projection plane and can be adjusted to an arbitrary position in the depth direction.

Note that, in the above description, an example in which the child projector takes the initiative to switch the display of the image has been illustrated. However, the parent projector may take the initiative to switch the display of the image.

Here, processing of the case where the parent projector takes the initiative to switch the display of the image will be described with reference to the flowchart in FIG. 15.

Note that, hereinafter, as illustrated in FIG. 13, the case of switching the image V2 in the fixed projection area Pa to move the image V2 outside the fixed projection area Pa will be described.

In step S201, the parent projector transmits the image takeover request command. To be specific, the image control unit 231 of the fixed-type projector system 12 generates the image takeover request command transmitted, and transmits the generated command to the image control unit 161 of the drive-type projector system 11. The image takeover request command includes the setting values of the characteristics of the image V2 at the time of takeover, similarly to the case where the child projector takes the initiative to switch the display of the image.

Note that the image control unit 231, for example, sets the setting values of the characteristics of the current image V2 of the fixed-type projector 51 to the image takeover request command as they are. Alternatively, the image control unit 231 sets a part or all of the setting values of the characteristics of the image V2 of the image takeover request command to different values from the setting values of the characteristics of the current image V2 of the fixed-type projector 51. In the latter case, the image control unit 231 sets the characteristics of the image V2 displayed by the fixed-type projector 51 to the setting values set in the image takeover request command.

In step S221, the child projector receives the image takeover request command. To be specific, the image control unit 161 of the drive-type projector system 11 receives the image takeover request command transmitted from the image control unit 231 of the fixed-type projector system 12. With the reception, the image control unit 161 acquires the setting values of the characteristics of the image V2.

Figure 12:
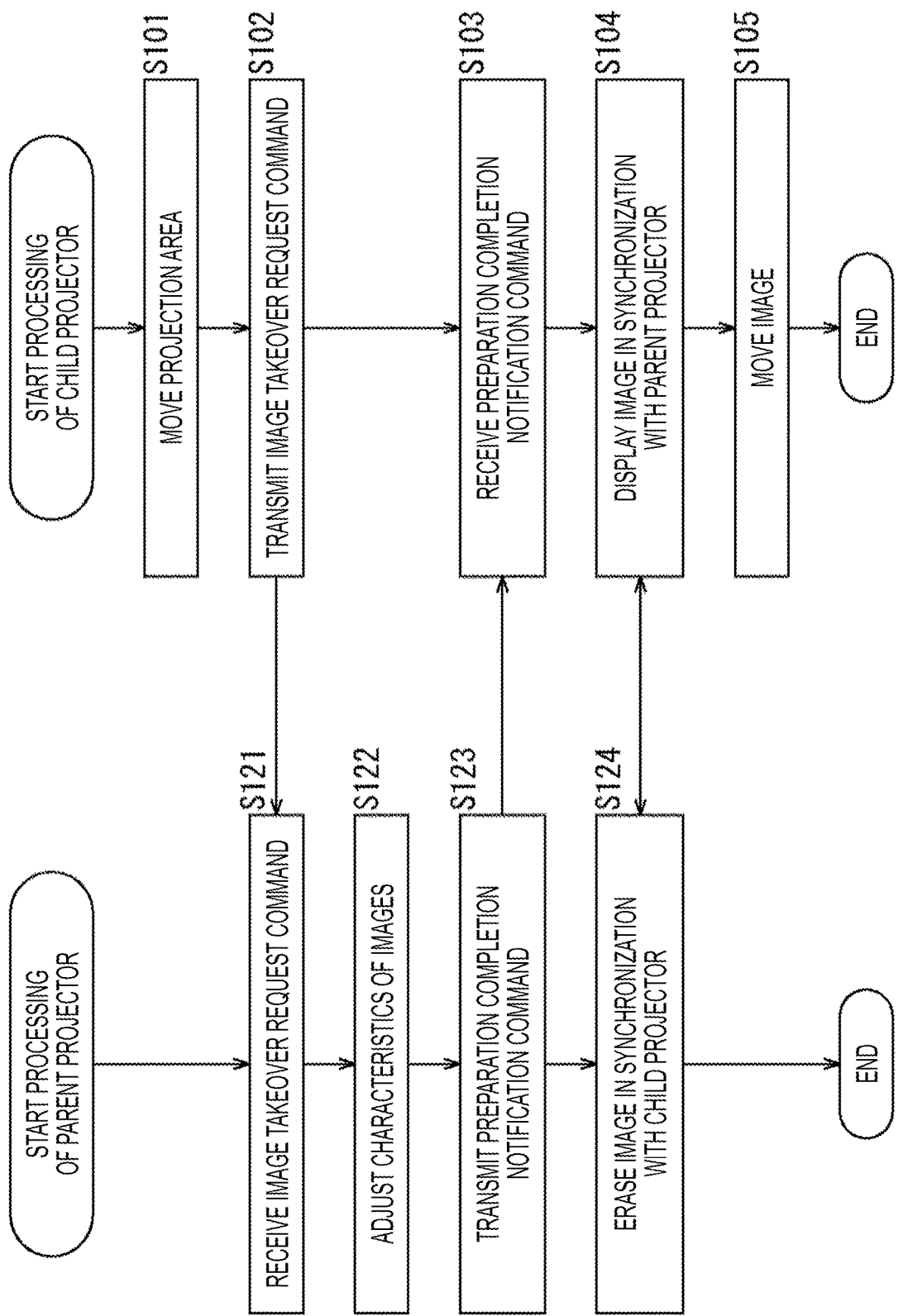
FIG. 12 is a flowchart for describing a first embodiment of processing in a case of switching an image within the fixed projection area.

In step S222, the child projector moves the projection area, similarly to the processing in step S101 in FIG. 12.

In step S223, the child projector adjusts the characteristics of the image. To be specific, the image control unit 161 of the drive-type projector system 11 performs setting of the drive-type projector 31 to start display of the image V2 with the characteristics described in the image takeover request command. With the setting, the characteristics of the image V2 by the drive-type projector 31 are adjusted to the characteristics of the V2 by the fixed-type projector 51.

In step S224, the child projector transmits the preparation completion notification command. To be specific, the image control unit 161 of the drive-type projector system 11 generates the preparation completion notification command and transmits the generated preparation completion notification command to the image control unit 231 of the fixed-type projector system 12.

In step S202, the parent projector receives the preparation completion notification command. To be specific, the image control unit 231 of the fixed-type projector system 12 receives the preparation completion notification command transmitted from the image control unit 161 of the drive-type projector system 11.

In step S203, the parent projector erases the image in synchronization with the child projector, similarly to the processing of step S124 in FIG. 13. Meanwhile, in step S225, the child projector displays the image in synchronization with the parent projector, similarly to the processing of step S104 in FIG. 13.

After that, the processing at the time of switching the image of the parent projector is terminated.

In step S226, the child projector moves the image, similarly to the processing of step S105 in FIG. 13.

After that, the processing at the time of switching the image of the child projector is terminated.

Note that the numbers and the types of the characteristics adjusted at the time of switching the display of the image are not limited to the above-described example, and can be changed as needed. For example, characteristics other than the above-described characteristics can be used.

Figure 15:
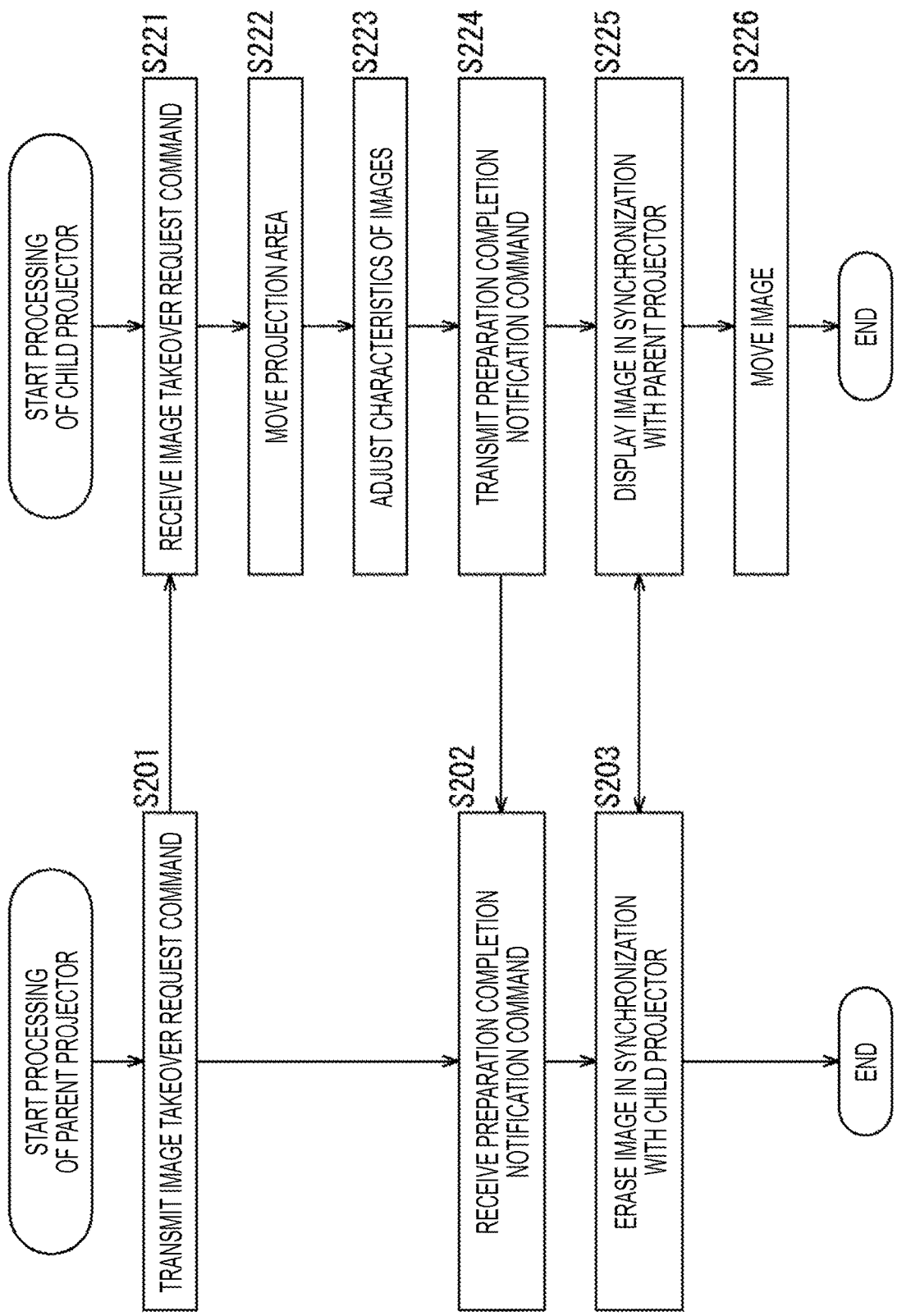
FIG. 15 is a flowchart for describing a second embodiment of the processing in the case of switching an image within the fixed projection area.

Further, in step S122 in FIG. 12 and step S223 in FIG. 15, the characteristics of the image of the parent projector are not necessarily accurately adjusted to the characteristics of the image of the child projector. For example, a certain level of difference may be accepted without providing the feeling of strangeness and discomfort to the user. That is, the difference between the characteristics of the image of the parent projector and the characteristics of the image of the child projector at the time of the switching may be set to fall within a predetermined range centered around 0 without providing feeling of strangeness and discomfort to the user.

Further, for example, to realize a special effect at the time of switching the image, a difference may be purposely made to the characteristics of the image of the parent projector and the characteristics of the image of the child projector. That is, the difference between the characteristics of the parent projector and the characteristics of the child projector at the time of switching may be set to fall within a predetermined range centered around a predetermined value other than 0.

2. Modification

Hereinafter, modifications of the above-described embodiment of the present technology will be described.

{Modification Regarding Configuration Example of System}

The configuration example of the AV system 10 in FIG. 1 is an example, and can be changed as necessary.

For example, the reflective speaker 101 may be provided separately from the drive-type projector 31 so that the reflective speaker 101 can be driven separately from the projector 102. With the configuration, the position of the virtual sound source can be more flexibly set. Similarly, for example, the reflective speaker 201 may be provided separately from the fixed-type projector 51 so that the reflective speaker 201 can be driven separately from the projector 202.

Further, for example, a part or the whole of the information processing apparatus 33 can be provided in the drive-type projector 31, or a part or the whole of the drive-type projector 31 can be provided in the information processing apparatus 33. Similarly, for example, a part or the whole of the information processing apparatus 52 can be provided in the fixed-type projector 51, or a part or the whole of the fixed-type projector 51 can be provided in the information processing apparatus 52.

Further, for example, the share of the functions between the information processing apparatus 33 and the information processing apparatus 52 can be changed, or the information processing apparatus 33 and the information processing apparatus 52 can be integrated. Further, for example, a part or the whole of the integration of the information processing apparatus 33 and the information processing apparatus 52 can be provided in the drive-type projector 31 or the fixed-type projector 51.

Further, for example, a part or the whole of the sensor unit 32 can be provided in the drive-type projector 31 or the information processing apparatus 33.

Further, for example, another drive-type projector system 11 may be provided instead of the fixed-type projector system 12.

Furthermore, the present technology can be applied to the case where the number of projectors is three or more, and in that case, the number of the drive-type projectors and the fixed-type projectors can be arbitrarily set.

Further, the image switching processing described with reference to FIGS. 12 to 15 can also be applied to the case of switching the image of the drive-type projector 31 to the image of the fixed-type projector 51.

Furthermore, the above-described image switching processing can also be applied to the case of switching the image of the drive-type projector to an image of another drive-type projector or to the case of switching the image of the fixed-type projector to an image of another fixed-type projector.

Further, the above-described image switching processing can also be applied to the case of switching all the images of the parent projector to the images of the child projector.

Furthermore, the above-described image switching processing can also be applied to the case of using three or more projectors. That is, since switching of images is performed between two projectors even in the case of using three or more projectors, the above-described technology can be applied.

Further, in the above description, an example of using the projector as a display device has been described. However, the present technology can be applied to the case of using a display device other than the projector. For example, the present technology can be applied to the case of using a normal display (for example, a liquid crystal display, an organic EL display, or the like), a display device for an augmented reality (AR) (for example, a head mount display (HMD) or the like), or the like.

Further, the combination of display devices is not necessarily limited to the same type. For example, any combination of display devices can be adopted as long as the combination enables overlap of the display ranges of the display devices and display of the image. In other words, any combination can be adopted as long as the combination enables at least partial overlap of the fields of view with respect to the images displayed by the display devices. Further, the combination of images to be superimposed may be real-world images by projectors, ordinary displays, or the like, virtual vides by AR display devices, or a combination of a real-world image and a virtual image.

For example, a projector and an HMD can be combined. As a case of combining the projector and the HMD, for example, a case in which an image projected by the projector is viewed by a user who wears the HMD is assumed. In this case, for example, the image of the HMD can be moved in the image of the projector, or the image of the HMD can be moved inside or outside the image of the projector. Further, for example, a case in which an image is projected by the projector within the field of view of the user who wears the HMD is assumed. In this case, for example, the image of the projector can be moved within the image of the HMD, or the image of the projector can be moved inside or outside the image of the HMD. Further, for example, a case of supplementing, by the HMD, the image outside the angle of view of the image projected by the projector is assumed. In this case, the image of the projector is displayed in the image of the HMD.

Further, for example, a normal display and an HMD can be combined. As a case of combining the normal display and the HMD, for example, a case in which an inside of an image displayed by the normal display is viewed by the user who wears the HMD. In this case, for example, the image of the HMD can be moved within the image of the normal display, or the image of the HMD can be moved inside or outside the image of the normal display. Further, a case of supplementing, by the HMD, the image outside the angle of view of the image displayed by the normal display is assumed. In this case, the image of the normal display is displayed in the image of the HMD.

Further, for example, a normal display and a projector can be combined. As a case of combining the ordinary display and the projector, for example, a case of projecting an image by the projector into a screen of the normal display is assumed. In this case, for example, the image of the projector can be moved within the image of the normal display, or the image of the projector can be moved inside or outside the image of the normal display. Further, for example, a case of projecting an image by the projector onto a projection plane in which the normal display is embedded is assumed. In this case, the image of the normal display is displayed in the image of the projector.

Note that the display control processing described with reference to FIGS. 7 to 15 can be realized by a similar method to the above-described method, regardless of the combination of the display devices. With the processing, an effect obtained by causing display ranges of a plurality of display devices to overlap in a field of view of a user and displaying an image can be enhanced.

For example, when the display device that displays the image before switching is the parent display device and the display device that displays the image after switching is the child display device regarding the processing of switching the image, the display of the image by the parent display device may just be stopped and the display of the image by the child display may just be started when a relationship between the image by the parent display device and the image by the child display device satisfies a predetermined condition. To be more specific, the display of the image by the parent display device may just be stopped and the display of the image by the child display may just be started when a difference between the characteristics of the image displayed in a first field of view from the parent display device and the characteristics of the image displayed in a second field of view at least partially overlapping with the first field of view from the child display device falls within a predetermined range.

Furthermore, not only an image but also a sound may be switched. For example, sound switching may be performed between the reflective speaker 101 of the drive-type projector 31 and the reflective speaker 201 of the fixed-type projector 51. For example, an output of a sound from a reflective speaker that is outputting the sound may just be stopped and an output of a sound from another reflective speaker may just be started when a difference in a characteristic between the sounds of both the speakers falls within the predetermined range.

Examples of the characteristics of the sounds to be used as the switching condition include a reflection position, a localization position in a depth direction, a volume, timing of sound, a frequency band, a musical interval, a pitch, and the like. Further, the type and combination of the characteristics of the sounds used as the switching condition can be arbitrarily set.

Note that the sound switching can be performed not only between reflective speakers but also between a reflective speaker and a normal speaker and between normal speakers.

Further, the sound switching may be performed in synchronization with the switching of the image as needed, or may be performed independently without being in synchronization with the switching of the image.

Further, in the above description, an example of moving the projection area by changing the direction of the projector 102 has been described. However, for example, the projection area may be moved by reflecting an image projected from the projector 102 at a reflector such as a mirror to change the direction of the reflector.

Similarly, in the above description, a case of moving the position of the virtual sound source by changing the direction of the reflective speaker 101 has been described. However, for example, the position of the virtual sound source may be moved by reflecting the output sound output from the reflective speaker 101 at a reflector such as a mirror to change the direction of the reflector.

Further, for example, the depth information in the display space may be acquired using a sensor other than the depth sensor 103.

{Modification Regarding Space Map}

The information included in the space map is not limited to the above-described example and can be changed as necessary. For example, color information, texture information, or the like of each position in the display space may be included in the space map on the basis of the information acquired by the camera 131 or the like.

Further, the space map does not necessarily need to include the information of all the areas in the display space, and may just include information of the projection target area that serves as the target on which at least an image is projected.

Furthermore, in the above description, an example of generating and using the integrated space map by integrating the first space map and the second space map has been described. However, only one of the first space map and the second space map can be generated and used.

Further, a part or the whole of the information of the space map may be provided to the information processing apparatus 33 from an outside.

{Other Modifications}

The type of the image to which the present technology is applied is not particularly limited, and for example, a moving image, a still image, a two-dimensional image, a three-dimensional image, or the like is adopted.

{Configuration Example of Computer}

The above-described series of processing of the information processing apparatus 33 and the information processing apparatus 52 can be executed by hardware or by software. In the case of executing the series of processing by software, a program that configures the software is installed in a computer. Here, the computer includes a computer incorporated in dedicated hardware, and a general-purpose personal computer and the like capable of executing various functions by installing various programs, for example.

Figure 16:
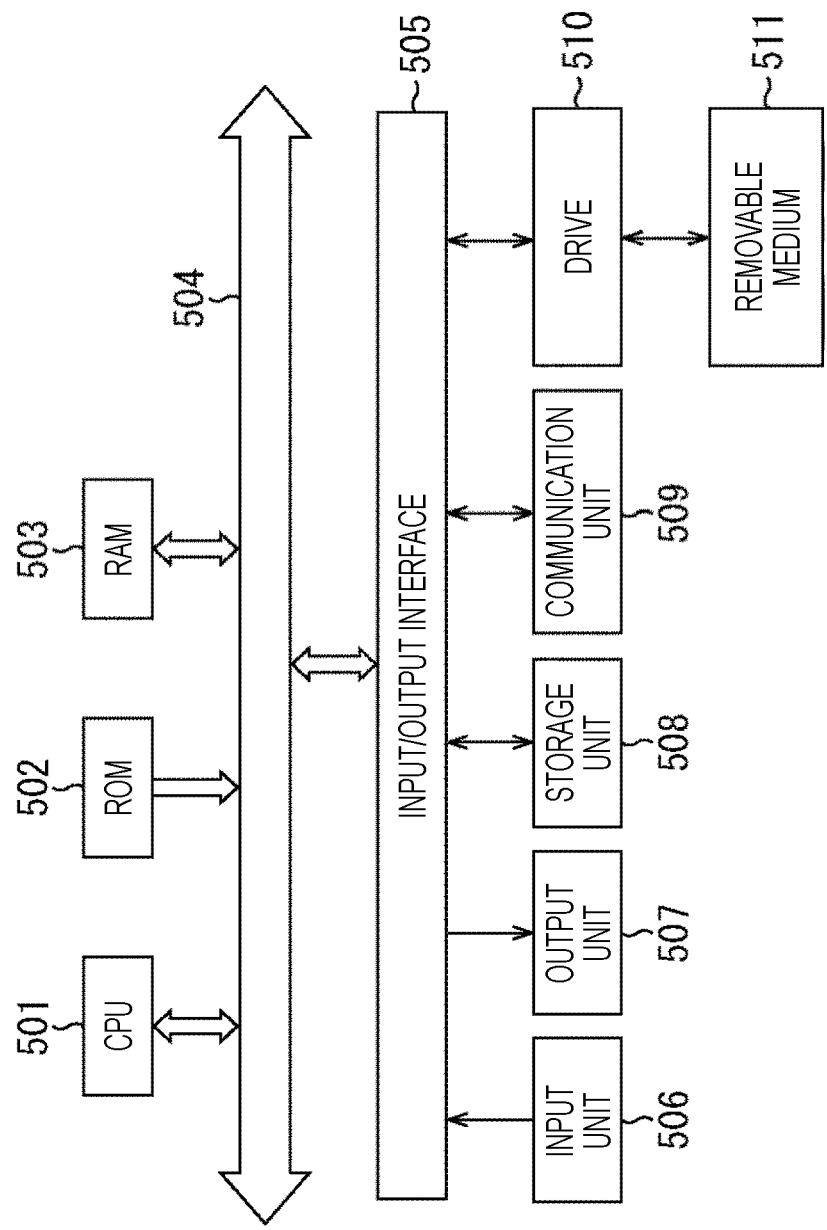
FIG. 16 is a block diagram illustrating a configuration example of a computer.

FIG. 16 is a block diagram illustrating a configuration example of hardware of a computer that executes the above-described series of processing by a program.

In a computer, a central processing unit (CPU) 501, a read only memory (ROM) 502, and a random access memory (RAM) 503 are mutually connected by a bus 504.

Further, an input/output interface 505 is connected to the bus 504. An input unit 506, an output unit 507, a storage unit 508, a communication unit 509, and a drive 510 are connected to the input/output interface 505.

The input unit 506 includes a keyboard, a mouse, a microphone, and the like. The output unit 507 includes a display, a speaker, and the like. The storage unit 508 includes a hard disk, a nonvolatile memory, and the like. The communication unit 509 includes a network interface and the like. The drive 510 drives a removable medium 511 such as a magnetic disk, an optical disk, a magneto-optical disk, or a semiconductor memory.

In the computer configured as described above, the CPU 501 loads a program stored in the storage unit 508 into the RAM 503 and executes the program via the input/output interface 505 and the bus 504, whereby the above-described series of processing is performed.

The program to be executed by the computer (CPU 501) can be recorded on the removable medium 511 as a package medium or the like, for example, and provided. Further, the program can be provided via a wired or wireless transmission medium such as a local area network, the Internet, or digital broadcast.

In the computer, the removable medium 511 is attached to the drive 510, whereby the program can be installed in the storage unit 508 via the input/output interface 505. Further, the program can be received by the communication unit 509 via a wired or wireless transmission medium and installed in the storage unit 508. Other than the above method, the program can be installed in the ROM 502 or the storage unit 508 in advance.

Note that the program executed by the computer may be a program processed in chronological order according to the order described in the present specification or may be a program executed in parallel or at necessary timing such as when a call is made.

Further, a plurality of computers may cooperate to perform the above-described processing. Then, a computer system is configured by one or a plurality of computers that performs the above-described processing.

Further, in the present specification, the term "system" means a group of a plurality of configuration elements (devices, modules (parts), and the like), and whether all the configuration elements are in the same casing is irrelevant. Therefore, a plurality of devices that is housed in separate casings and connected via a network, and one device that houses a plurality of modules in one casing are both systems.

Further, embodiments of the present technology are not limited to the above-described embodiments, and various modifications can be made without departing from the gist of the present technology.

For example, in the present technology, a configuration of cloud computing in which one function is shared and processed in cooperation by a plurality of devices via a network can be adopted.

Further, the steps described in the above-described flowcharts can be executed by one device or can be executed by a plurality of devices in a shared manner.

Furthermore, when a plurality of processes is included in one step, the plurality of processes included in the one step can be executed by one device or can be shared and executed by a plurality of devices.

Further, the effects described in the present specification are merely examples and are not limited, and other effects may be exhibited.

Further, for example, the present technology can have the following configurations.

(1)

An information processing apparatus including:

an image control unit configured to, when a relationship between a first image and a second image satisfies a predetermined condition, the first image being displayed in a first field of view from a first display device, and the second image being displayed in a second field of view at least partially overlapping with the first field of view from a second display device different from the first display device, start display of the second image from the second display device.

(2)

The information processing apparatus according to (1), in which the first display device and the second display device are projectors, and when the relationship between the first image and the second image satisfies the predetermined condition, the first image being at least a part of an image projected on a first area from the first display device, and the second image being projected on a second area at least partially overlapping with the first area from the second display device, the image control unit starts projection of the second image from the second display device.

(3)

The information processing apparatus according to (2), in which the predetermined condition is that a difference between a characteristic of the first image and a characteristic of the second image falls within a predetermined range.

(4)

The information processing apparatus according to (3), in which the characteristic of the first image and the characteristic of the second image include at least one of a projection position, a localization position in a depth direction, luminance, resolution, a geometric correction value, a frame rate, a color, and a display size.

(5)

The information processing apparatus according to (3) or (4), in which the image control unit controls the first image or the second image so that the difference between the characteristic of the first image and the characteristic of the second image falls within the predetermined range, before starting the projection of the second image.

(6)

The information processing apparatus according to (5), in which one image of the first image and the second image is a three-dimensional image.

(7)

The information processing apparatus according to (6), in which, when the other image of the first image and the second image is a two-dimensional image, the image control unit adjusts a localization position in a depth direction of the one image to a plane on which an image is projected, before starting the projection of the second image.

(8)

The information processing apparatus according to any one of (5) to (7), in which the image control unit adjusts the characteristic of the first image to the characteristic of the second image.

(9)

The information processing apparatus according to (8), in which the image control unit acquires a setting value of the characteristic of the first image from a control unit that controls display of the second image.

(10)

The information processing apparatus according to any one of (5) to (7), in which the image control unit adjusts the characteristic of the second image to the characteristic of the first image.

(11)

The information processing apparatus according to (10), in which the image control unit acquires a setting value of the characteristic of the second image from a control unit that controls display of the first image.

(12)

The information processing apparatus according to any one of (1) to (11), in which the image control unit starts movement of a projection position of the second image after starting projection of the second image.

(13)

The information processing apparatus according to any one of (1) to (12), in which, in a case of projecting an image of the second display device within a projection area of an image of the first display device, the image control unit sets at least a part of a characteristic of the image of the second display device to a value different from the image of the first display device.

(14)

The information processing apparatus according to (13), in which the image control unit sets at least one of resolution and luminance of the image of the second display device to be higher than that of the image of the first display device.

(15)

The information processing apparatus according to any one of (1) to (14), in which the image control unit causes the second display device to project an image related to an image of the first display device, the image of the first display device being displayed in a projection area or a vicinity of the projection area of the second display device.

(16)

The information processing apparatus according to any one of (1) to (15), further including:

the first display device or the second display device.

(17)

The information processing apparatus according to any one of (1) to (16), in which at least one of the first display device and the second display device is a drive-type projector.

(18)

An information processing method including:

an image control step of, when a relationship between a first image and a second image satisfies a predetermined condition, the first image being displayed in a first field of view from a first display device, and the second image being displayed in a second field of view at least partially overlapping with the first field of view from a second display device different from the first display device, starting display of the second image from the second display device.

(19)

A program for causing a computer system to execute processing including:

an image control step of, when a relationship between a first image and a second image satisfies a predetermined condition, the first image being displayed in a first field of view from a first display device, and the second image being displayed in a second field of view at least partially overlapping with the first field of view from a second display device different from the first display device, starting display of the second image from the second display device.

REFERENCE SIGNS LIST

10 AV system
11 Drive-type projector system
12 Fixed-type projector system
31 Drive-type projector
32 Sensor unit
33 Information processing apparatus
51 Fixed-type projector
52 Information processing apparatus
71 Pointing device
101 Reflective speaker
102 Projector
103 Depth sensor
104 Drive unit
111 Pan motor
112 Tilt motor
113 Motor control unit
131 Camera
132 Fisheye camera
133 Microphone
152 Pointing position detection unit
153 User detection unit
154 Map generation unit
156 Moving amount calculation unit
158 Control unit
161 Image control unit
162 Acoustic control unit
201 Reflective speaker
202 Projector
224 Control unit
231 Image control unit
232 Acoustic control unit

The invention claimed is:

1. An information processing apparatus comprising:
an image control unit configured to
start an initial display of a first image from a first display device, and
after the starting of the initial display of the first image from the first display device, stop display of the first image from the first display device and start an initial display of a second image from a second display device, based on a relationship between the first image and the second image satisfying a predetermined condition in which the first image is displayed in a first field of view from the first display device, and the second image is displayed in a second field of view at least partially overlapping with the first field of view from the second display device different from the first display device,
wherein the initial display of the first image occurs before the initial display of the second image,
wherein, after the display of the first image is stopped and the initial display of the second image is started, the second image is continuously displayed while the display of the first image is stopped, and
wherein the image control unit is implemented via at least one processor.

2. The information processing apparatus according to claim 1, wherein
the first display device and the second display device are projectors, and
wherein the image control unit starts projection of the second image from the second display device and stops display of the first image from the first display device, based on the relationship between the first image and the second image satisfying the predetermined condition in which the first image is at least a part of an image projected on a first area from the first display device, and the second image is projected on a second area at least partially overlapping with the first area from the second display device.

3. The information processing apparatus according to claim 2, wherein
the predetermined condition is that a difference between a characteristic of the first image and a characteristic of the second image falls within a predetermined range.

4. The information processing apparatus according to claim 3, wherein
the characteristic of the first image and the characteristic of the second image include at least one of a projection position, a localization position in a depth direction, luminance, resolution, a geometric correction value, a frame rate, a color, and a display size.

5. The information processing apparatus according to claim 3, wherein
the image control unit controls the first image or the second image so that the difference between the characteristic of the first image and the characteristic of the second image falls within the predetermined range, before starting the projection of the second image.

6. The information processing apparatus according to claim 5, wherein
one image of the first image and the second image is a three-dimensional image.

7. The information processing apparatus according to claim 6, wherein
the image control unit adjusts a localization position in a depth direction of the one image to a plane on which an image is projected before starting the projection of the second image, based on another image of the first image and the second image being a two-dimensional image.

8. The information processing apparatus according to claim 5, wherein
the image control unit adjusts the characteristic of the first image to the characteristic of the second image.

9. The information processing apparatus according to claim 8, wherein
the image control unit acquires a setting value of the characteristic of the first image from a control unit that controls display of the second image.

10. The information processing apparatus according to claim 5, wherein
the image control unit adjusts the characteristic of the second image to the characteristic of the first image.

11. The information processing apparatus according to claim 10, wherein
the image control unit acquires a setting value of the characteristic of the second image from a control unit that controls display of the first image.

12. The information processing apparatus according to claim 1, wherein
the image control unit starts movement of a projection position of the second image after starting projection of the second image.

13. The information processing apparatus according to claim 1, wherein,
in a case of projecting an image of the second display device within a projection area of an image of the first display device, the image control unit sets at least a part of a characteristic of the image of the second display device to a value different from the image of the first display device.

14. The information processing apparatus according to claim 13, wherein
the image control unit sets at least one of resolution and luminance of the image of the second display device to be higher than that of the image of the first display device.

15. The information processing apparatus according to claim 1, wherein
the image control unit causes the second display device to project an image related to an image of the first display device, the image of the first display device being displayed in a projection area or a vicinity of the projection area of the second display device.

16. The information processing apparatus according to claim 1, further comprising:
the first display device or the second display device.

17. The information processing apparatus according to claim 1, wherein
at least one of the first display device and the second display device is a drive- type projector.

18. The information processing apparatus according to claim 1, wherein the predetermined condition includes characteristics of the first image and the second image matching.

19. The information processing apparatus according to claim 1, wherein the stopping of the display of the first image from the first display device is concurrent with the starting of the initial display of the second image from the second display device.

20. An information processing method comprising:
starting an initial display of a first image from a first display device; and
after the starting of the initial display of the first image from the first display device, stopping display of the first image from the first display device and starting an initial display of a second image from a second display device, based on a relationship between the first image and the second image satisfying a predetermined condition in which the first image is displayed in a first field of view from the first display device, and the second image is displayed in a second field of view at least partially overlapping with the first field of view from the second display device different from the first display device,
wherein the initial display of the first image occurs before the initial display of the second image, and
wherein, after the display of the first image is stopped and the initial display of the second image is started, the second image is continuously displayed while the display of the first image is stopped.

21. A non-transitory computer-readable medium having embodied thereon a program, which when executed by a computer causes the computer to execute an information processing method, the method comprising:
starting an initial display of a first image from a first display device; and
after the starting of the initial display of the first image from the first display device, stopping display of the first image from the first display device and starting an initial display of a second image from a second display device, based on a relationship between the first image and the second image satisfying a predetermined condition in which the first image is displayed in a first field of view from the first display device, and the second image is displayed in a second field of view at least partially overlapping with the first field of view from the second display device different from the first display device,
wherein the initial display of the first image occurs before the initial display of the second image, and
wherein, after the display of the first image is stopped and the initial display of the second image is started, the second image is continuously displayed while the display of the first image is stopped.

* * * * *